United States Patent
DiFrancesco et al.

(10) Patent No.: US 9,063,345 B2
(45) Date of Patent: Jun. 23, 2015

(54) SUPER LIGHT-FIELD LENS WITH DOUBLET LENSLET ARRAY ELEMENT

(75) Inventors: David DiFrancesco, Point Richmond, CA (US); Thomas Douglas Selkirk Duff, Berkeley, CA (US); Mark Vande Wettering, El Sobrante, CA (US); Tolis Deslis, Superior, CO (US)

(73) Assignee: PIXAR, Emeryville, CA (US)

(*) Notice: Subject to any disclaimer, the term of this patent is extended or adjusted under 35 U.S.C. 154(b) by 399 days.

(21) Appl. No.: 13/079,720

(22) Filed: Apr. 4, 2011

(65) Prior Publication Data

US 2011/0249341 A1 Oct. 13, 2011

Related U.S. Application Data

(63) Continuation-in-part of application No. 12/717,842, filed on Mar. 4, 2010.

(60) Provisional application No. 61/252,996, filed on Oct. 19, 2009.

(51) Int. Cl.
*G02B 27/46* (2006.01)
*G02B 13/00* (2006.01)
(Continued)

(52) U.S. Cl.
CPC ............... *G02B 27/46* (2013.01); *G02B 13/00* (2013.01); *G02B 15/161* (2013.01); *G02B 27/2228* (2013.01); *G03B 17/14* (2013.01); *H04N 5/2254* (2013.01)

(58) Field of Classification Search
USPC ........................................... 348/46, 335, 340
See application file for complete search history.

(56) References Cited

U.S. PATENT DOCUMENTS 5,270,859 A * 12/1993 Wirth et al. .................. 359/622
5,696,371 A    12/1997 Meyers
(Continued)

FOREIGN PATENT DOCUMENTS

JP          08166502 A     6/1996

OTHER PUBLICATIONS

Adelson et al. ("Single Lens Stereo with a Plenoptic Camera", IEEE Transactions of Pattern Analysis and Machine Intelligence, vol. 14, No. 2, Feb. 1992.*

(Continued)

*Primary Examiner* — Roberto Velez
*Assistant Examiner* — Yih-Sien Kao
(74) *Attorney, Agent, or Firm* — Kilpatrick Townsend & Stockton LLP

(57) ABSTRACT

Light field imaging systems, and in particular light field lenses that can be mated with a variety of conventional cameras (e.g., digital or photographic/film, image and video/movie cameras) to create light field imaging systems. Light field data collected by these light field imaging systems can then be used to produce 2D images, right eye/left eye 3D images, to refocus foreground images and/or background images together or separately (depth of field adjustments), and to move the camera angle, as well as to render and manipulate images using a computer graphics rendering engine and compositing tools. A doublet lenslet array element for use in light field imaging systems includes a first lenslet array element having a first plurality of lenslet array elements, and a second lenslet array element having a first plurality of lenslet array elements, wherein the first lenslet array element is coupled in close proximity to the second lenslet array element. The first and second lenslet array elements are glued together or otherwise bonded together and the first lenslet array element is made from a first optical material different than a second material forming the second lenslet array element.

8 Claims, 24 Drawing Sheets

(51) Int. Cl.
  *G02B 15/16* (2006.01)
  *G03B 17/14* (2006.01)
  *H04N 5/225* (2006.01)
  *G02B 27/22* (2006.01)

(56) References Cited

U.S. PATENT DOCUMENTS

| | | | |
|---|---|---|---|
| 6,621,065 | B1 | 9/2003 | Fukumoto et al. |
| 6,765,603 | B2 | 7/2004 | Border et al. |
| 7,587,109 | B1 * | 9/2009 | Reininger .................... 385/116 |
| 2002/0067467 | A1 * | 6/2002 | Dorval et al. .................. 353/10 |
| 2003/0118290 | A1 * | 6/2003 | Border et al. ................... 385/52 |
| 2004/0156130 | A1 | 8/2004 | Powell et al. |
| 2004/0239876 | A1 | 12/2004 | Levine |
| 2005/0185819 | A1 | 8/2005 | Delp et al. |
| 2006/0279845 | A1 * | 12/2006 | Gurevich et al. ............. 359/622 |
| 2009/0096865 | A1 | 4/2009 | McKinley |
| 2009/0097131 | A1 * | 4/2009 | Iijima .......................... 359/684 |
| 2009/0102956 | A1 | 4/2009 | Georgiev |
| 2009/0185801 | A1 | 7/2009 | Georgiev et al. |
| 2009/0262182 | A1 | 10/2009 | Javidi et al. |
| 2009/0295829 | A1 | 12/2009 | Georgiev et al. |
| 2010/0066895 | A1 | 3/2010 | Ueda et al. |
| 2010/0080002 | A1 | 4/2010 | Kadar-Kallen |
| 2011/0123063 | A1 | 5/2011 | Delp et al. |

OTHER PUBLICATIONS

SUSS MicroOptics SA Catalog 2007 on Microlens Arrays.*
Bishop, T.E. et al., "The Light Camera: Extended Depth of Field, Aliasing and Super-resolution," *IEEE Transaction of Pattern Recognition and Machine Intelligence*—Draft, Mar. 24, 2010, pp. 1-34, 2 pages of publication information.
Ng, R. et al., "Light Field Photography with a Hand-held Plenoptic Camera," *Stanford Tech Report CTSR 2005-02*, Apr. 2005, pp. 1-11.
Final Office Action for U.S. Appl. No. 13/079,715, dated Jan. 29, 2014, 25 pages.
Office Action dated Jul. 10, 2014 in U.S. Appl. No. 13/079,715, filed Apr. 4, 2011, 35 pages.
International Search Report and Written Opinion mailed Jan. 2, 2012, for International Application No. PCT/US2011/031136, 11 pages.
Non-Final Office Action, dated Oct. 30, 2014, in U.S. Appl. No. 13/865,874. 38 pages.
Adelson et al., "Single Lens Stereo with a Plenoptic Camera," IEEE Transactions of Pattern Analysis and Machine Intelligence, Feb. 1992, vol. 14, No. 2.
Ng et al., "Light Field Photography with a Hand-held Plenoptic Camera," Stanford Tech Report CTSR 2005-02.

* cited by examiner

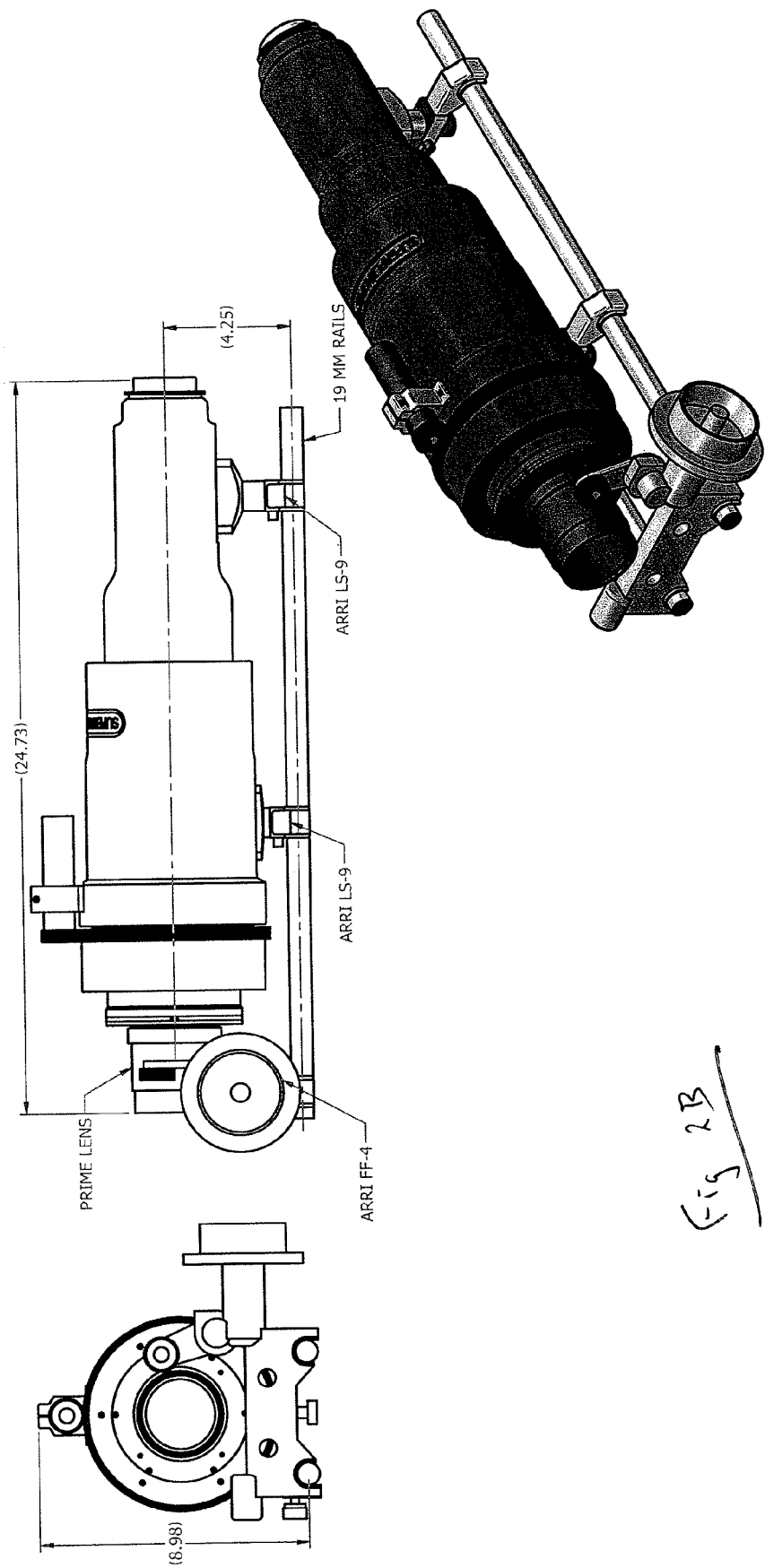

Super Plenoptic Lens with Vista Vision Camera

Super Plenoptic Lens with RedOne Camera

| focal length | full angle of view | image circle diameter | vertical "area" covered | horizontal "area" covered | diagonal "area" covered | image circle / diagonal "area" covered | max mag | fractional error | image distance at max mag | delta image diagonal from infinity | delta image distance / focal length |
|---|---|---|---|---|---|---|---|---|---|---|---|
| mm | degrees | mm | mm | mm | mm | | | | mm | mm | |
| 50 | 82 | 86.93 | 63 | 78 | 100.3 | 0.87 | 0.88 | 0.015 | 94 | 44 | 0.88 |
| 65 | 68 | 87.69 | 80 | 100 | 128.1 | 0.68 | 0.70 | 0.022 | 110.5 | 45.5 | 0.7 |
| 90 | 53 | 89.74 | 110 | 136 | 174.9 | 0.51 | 0.51 | 0.006 | 135.9 | 45.9 | 0.51 |
| 110 | 44 | 88.89 | 135 | 167 | 214.7 | 0.41 | 0.42 | 0.014 | 156.2 | 46.2 | 0.42 |
| 150 | 33 | 88.86 | 183 | 227 | 291.6 | 0.30 | 0.31 | 0.017 | 196.5 | 46.5 | 0.31 |
| 180 | 28 | 89.76 | 217 | 270 | 346.4 | 0.26 | 0.26 | 0.003 | 226.8 | 46.8 | 0.26 |
| 250 | 20 | 88.16 | 297 | 369 | 473.7 | 0.19 | 0.19 | 0.020 | 297.5 | 47.5 | 0.19 |
| 500 | 10 | 87.49 | 597 | 740 | 950.8 | 0.09 | 0.09 | 0.022 | 545 | 45 | 0.09 |

The data in columns A, B, C, D, E, and I are directly from the Mamiya data sheets.
The data in column F is the diagonal of the "covered" rectangle The data in columns H, I, and J shows the relationship between: the "area covered", the image circle, and the max mag.

The data in column L shows the image distance change from focus at infinity to closest object distance is about 45 mm.
The "fixed" image distance change implies the lens travel over the full focal range is about 45 mm for all of the lenses I've listed.
Now there is enough information to figure out the full range of behavior for the Lenslet "reimaging", for the Mamiya lenses.

FIG. 12

| aspect ratio | 1.33 | | | | | | | |
|---|---|---|---|---|---|---|---|---|
| | | | LENSLETS ON HORIZONTAL EDGE | | | | | |
| image circle diameter (mm) | frame horizontal (mm) | frame vertical (mm) | 50 (microns) | 75 (microns) | 100 (microns) | Stanford 125 (microns) | Pixar 161 (microns) | Edmund 142/inch 179 (microns) | Edmund 64/inch 400 (microns) |
| 5 | 4.00 | 3.00 | 80 | 53 | 40 | 32 | 25 | 22 | 10 |
| 10 | 7.99 | 6.01 | 160 | 107 | 80 | 64 | 50 | 45 | 20 |
| 15 | 11.00 | 9.01 | 240 | 160 | 120 | 96 | 74 | 67 | 30 |
| 20 | 15.99 | 12.02 | 320 | 213 | 160 | 128 | 99 | 89 | 40 |
| 25 | 19.99 | 15.02 | 400 | 266 | 200 | 160 | 124 | 112 | 50 |
| 30 | 23.08 | 18.03 | 480 | 320 | 240 | 192 | 149 | 134 | 60 |
| 35 | 27.97 | 21.03 | 559 | 373 | 280 | 224 | 174 | 156 | 70 |
| 40 | 31.97 | 24.04 | 639 | 426 | 320 | 256 | 199 | 179 | 80 |
| 45 | 35.97 | 27.04 | 719 | 480 | 360 | 288 | 223 | 201 | 90 |
| 50 | 39.96 | 30.05 | 799 | 533 | 400 | 320 | 248 | 223 | 100 |
| 55 | 43.96 | 33.05 | 879 | 586 | 440 | 352 | 173 | 246 | 110 |
| 60 | 47.96 | 36.06 | 959 | 639 | 480 | 384 | 298 | 268 | 120 |
| 65 | 51.95 | 39.06 | 1039 | 693 | 520 | 416 | 323 | 290 | 130 |
| 70 | 55.95 | 42.07 | 1119 | 748 | 559 | 448 | 348 | 313 | 140 |
| 75 | 59.95 | 45.07 | 1199 | 799 | 599 | 480 | 372 | 335 | 150 |
| 80 | 63.94 | 48.08 | 1279 | 853 | 639 | 512 | 397 | 357 | 160 |
| 85 | 67.94 | 51.08 | 1359 | 906 | 679 | 544 | 422 | 380 | 170 |
| 90 | 71.94 | 54.09 | 1439 | 959 | 719 | 576 | 447 | 402 | 180 |

*FIG. 13*

LENSLETS / FRAME

| 50 (microns) | 75 (microns) | 100 (microns) | Stanford 125 (microns) | Pixar 161 (microns) | 175 (microns) | 200 (microns) |
|---|---|---|---|---|---|---|
| 4803 | 2135 | 1201 | 769 | 463 | 392 | 300 |
| 19213 | 8539 | 4803 | 3074 | 1853 | 1568 | 1201 |
| 43230 | 10213 | 10808 | 6017 | 4160 | 3529 | 2702 |
| 76854 | 34157 | 19213 | 12297 | 7412 | 6274 | 4803 |
| 120084 | 53371 | 30021 | 19219 | 11582 | 9803 | 7505 |
| 172921 | 76854 | 43230 | 27667 | 16678 | 14116 | 10808 |
| 236364 | 104606 | 58841 | 37858 | 22700 | 18213 | 14710 |
| 307414 | 136529 | 76854 | 49185 | 29649 | 25095 | 19213 |
| 389071 | 172921 | 97268 | 62251 | 37525 | 31761 | 24317 |
| 480335 | 213482 | 120084 | 76854 | 46327 | 39211 | 30021 |
| 581205 | 258314 | 145301 | 92993 | 56055 | 47445 | 36325 |
| 691683 | 307414 | 172921 | 110869 | 66711 | 56464 | 43230 |
| 811766 | 380785 | 202942 | 129883 | 78292 | 66287 | 50735 |
| 941457 | 418425 | 235364 | 150833 | 90801 | 76854 | 58841 |
| 1080754 | 480335 | 270189 | 172921 | 104235 | 88225 | 67547 |
| 1229658 | 548515 | 307414 | 198745 | 118597 | 100380 | 76854 |
| 1385189 | 616964 | 347042 | 222107 | 133885 | 113320 | 86781 |
| 1556286 | 691683 | 389971 | 249006 | 150000 | 127044 | 97268 |

*FIG. 13
(Continued)*

| Current MP Lens for Super Plenoptic Lens | | Equivalent Focal Length Prime Lens for Super Plenoptic Lens | | | | | | |
|---|---|---|---|---|---|---|---|---|
| Zeiss Master Prime | | Prime Lens #1 | | | Prime Lens #2 | | | |
| Focal Length | FOV | Focal Length | FOV | Image Circle | Focal Length | FOV | Image Circle | |
| 18mm | 70° | | | | AF 45mm f2.8 | 74° | 67.4mm | |
| 25mm | 53° | | | | LS 80mm f2.8 | 47° | 67.4mm | |
| 35mm | 38° | 110mm f2.8 | 44° | 93.3° | LS 110mm f2.8 | 44° | 67.4mm | |
| 50mm | 28.2° | | | | AF 150mm f2.8 | 26° | 67.4mm | |
| 85mm | 16.6° | 350mm f5.6 | 15° | 93.3mm | | | | |
| 100mm | 12.6° | 500mm f6 | 10° | 93.3mm | | | | |

*FIG. 14*

NOTES:
1. The substrate material is Fused silica.
2. The substrate thickness is 1.00mm +/-0.025mm.
3. No AR coating
4. The lens prescription is:
   4.1 Packing: Square
   4.2 Pitch: 160um x 160um
   4.3 Focal length: 448 um
   4.4 Radius of curvature: 0.206 mm
   4.5 Conic constant: -2.13
   4.6 Sag: 29 um
5. The lenses are recessed into the surface such that the center thickness of the lenses are less than the original 1.0mm thickness of the substrate
6. Clear aperture: 75 mm
7. The lenses will fit the clear aperture.
8. The flat will be parallel to the lenses within 5 arcminutes

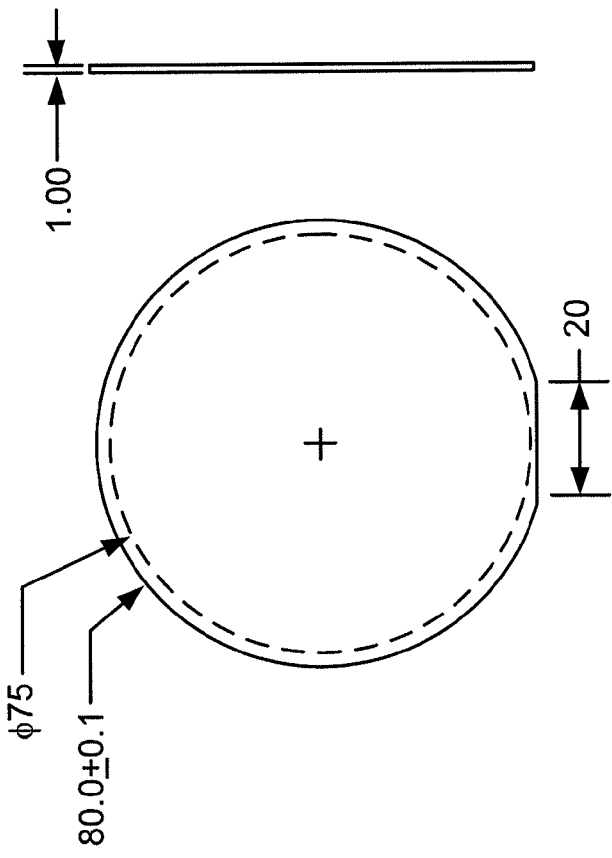

FIG. 20

SUPER LIGHT-FIELD LENS WITH DOUBLET LENSLET ARRAY ELEMENT

CROSS-REFERENCES TO RELATED APPLICATIONS

This application is a Continuation-in-Part of U.S. patent application Ser. No. 12/717,842, filed Mar. 4, 2010, entitled "Super Light Field Lens," which claims the benefit of U.S. Provisional Application Ser. No. 61/252,996, filed Oct. 19, 2009, entitled "Super Light Field Lens," both of which are hereby incorporated by reference in their entirety for all purposes.

BACKGROUND

The present invention relates generally to optical systems, and more particularly to light field imaging systems or plenoptic imaging systems.

In prior light field gathering systems, or plenoptic imaging systems, a prime lens typically focuses light onto a lenslet array positioned close to the focal plane of the prime lens. The lenslet array includes a plurality of microlenses that each refracts light to thereby form a plurality of microlens images that are collected by a sensor located proximal the focal plane of the microlenses. Typically this distance to the sensor is on the order of a couple to a few millimeters (mm) from the lenslet array as determined by the aperture and f# of the microlenses. Hence, prior systems were constrained as they could not be used with cameras which typically require a minimum lens clearance of about 30 to 40 mm, which far exceeds the 3 or 4 mm clearance provided by the lenslet array. Further, adapting cameras to work with such a plenoptic imaging system can be a costly and onerous solution.

Therefore it is desirable to provide systems and lenses that overcome the above and other problems, including lens systems that mate with cameras.

BRIEF SUMMARY

The present invention provides light field imaging systems, and in particular light field lenses that can be mated with a variety of conventional cameras (e.g., digital or photographic/film, image and video/movie cameras, and DSLR cameras) to create light field imaging systems. Light field data collected by these light field imaging systems can then be used to produce 2-dimensional (2D) images, right eye/left eye 3D images, to refocus foreground images and/or background images together or separately (depth of field adjustments), and to move the camera angle, to name a few examples. The data can also be used to render and manipulate images using a computer graphics rendering engine such as RenderMan® for example in a post production process.

In one embodiment, a light field imaging system includes a field lens, a lenslet array positioned proximal the focal plane of the field lens and a relay optical element configured to gather the light field refracted by the lenslet array, to collimate the light field and to focus the light field onto an image plane. A sensor, such as a CCD sensor, a CMOS sensor or photographic film may be located proximal the image plane to capture resulting images.

In one embodiment, a super plenoptic lens is provided that includes a field lens and a lenslet array positioned proximal the focal plane of the field lens. The lens also includes relay optical elements configured and arranged to collimate and focus light refracted by the lenslet array onto an image plane. A sensor, such as a CCD sensor, a CMOS sensor or photographic film may be located proximal the image plane to capture resulting images.

In certain aspects, a field lens can be used with a prime lens (or any other fixed focal length lens) or a zoom lens. Also, any prime lenses with a large numerical aperture may be used, such as master prime lenses.

In one embodiment, each element of the plenoptic imaging system is interchangeable during use. For example, the lenslet array (e.g., a lenslet array element) may be interchanged, the prime lens may be interchanged, and the camera or sensor system itself may be interchanged to facilitate adaptability during use. Software stored in a controller system can include preset information, calibration information, etc. for use in controlling the plenoptic camera depending on the particular characteristics of the components being used.

In one embodiment, a method of calibrating a superplenoptic lens having a lenslet array is provided. The method typically includes obtaining a field of images including a plurality of images, each lenslet image corresponding to a lenslet in the lenslet array, filtering the field of images, identifying a plurality of extrema in the filtered images, and using the extrema to determine locations and spacings of the lenslet images. The extrema may be maxima, e.g., peaks, or minima. In certain aspects, filtering the field image includes performing an autocorrelation.

According to another embodiment, a method is provided for processing an image acquired using a plenoptic camera having a lenslet array element comprising a plurality of lenslets arranged in an array, the lenslet array element being positioned to refract light from a field lens to a relay lens, the relay lens being positioned and configured to gather light refracted from the lenslet array and to focus the gathered light on to a sensor element. The method typically includes acquiring an image of a light field using the sensor element, the acquired image including an array or matrix of individual lenslet images, determining depth information for the light field using the acquired image, and adjusting the image using the depth information for the light field to produce an adjusted image. The adjusted image may represent a new camera (e.g., different angle or position of the camera), or it may include different features in focus, or it may include a 2-D or a 3-D representation. In certain aspects, adjusting includes adjusting the focus of features of the image such that different image planes in a scene are in focus. In certain aspects, adjusting includes changing one of a camera angle or camera position with respect to one or more objects in the acquired image using a post acquisition process. In certain aspects, adjusting includes one of moving the camera position forward or backwards, panning the camera, tilting the camera or zooming the camera. In certain aspects, the method is executed for a series of images, e.g., for motion picture processing.

Various embodiments described herein advantageously allow for the lens to gather the light field rather than a camera or sensor. Lenses according to various embodiments can be configured with appropriate optical manipulation characteristics and physical dimensions to allow for coupling with a variety of cameras.

In certain aspects, the system has a small form factor to facilitate portable use. For example, the system could attach to the back of a camera rig and the camera and data system could both rest on an operator's shoulder. The data system in certain aspects is configured to operate using internal battery power, but could also operate using a connection to an external power source.

In one embodiment, a system for plenoptic photography is provided. The system typically includes a doublet lenslet array element including a first lenslet array element coupled in close proximity to a second lenslet array element, each of the first and second lenslet array elements having a plurality of lenslets arranged in an array. The system also typically includes a sensor element, and an optical relay element positioned between the doublet lenslet array element and the sensor element, the relay element being configured to gather light refracted from the doublet lenslet array and to focus the gathered light on to the sensor element.

In one embodiment, a doublet lenslet array element is provided that typically includes a first lenslet array element having a first plurality of lenslet array elements, and a second lenslet array element having a first plurality of lenslet array elements, wherein the first lenslet array element is coupled in close proximity to the second lenslet array element. In certain aspects, the first and second lenslet array elements are glued together or otherwise bonded together.

In certain aspects, the first lenslet array element is made from a first optical material, and the second lenslet array element is made of a second optical material, wherein the first material is different than the second material. Examples of materials include fused silica, borosilicate, or fused quartz.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 5 illustrates two pictures of a lens according to one embodiment.

FIG. 12 illustrates image circle metadata for a superplenoptic lens as shown in FIG. 7.

FIG. 14 shows data for various motion picture prime lenses.

FIG. 20 illustrates an example of a lenslet array element (shown as an optical flat with no visual detail shown of the lenslets, which can be circular, non-circular, e.g., hexagonal, etc.) according to one specific embodiment.

DETAILED DESCRIPTION

Figure 1A:
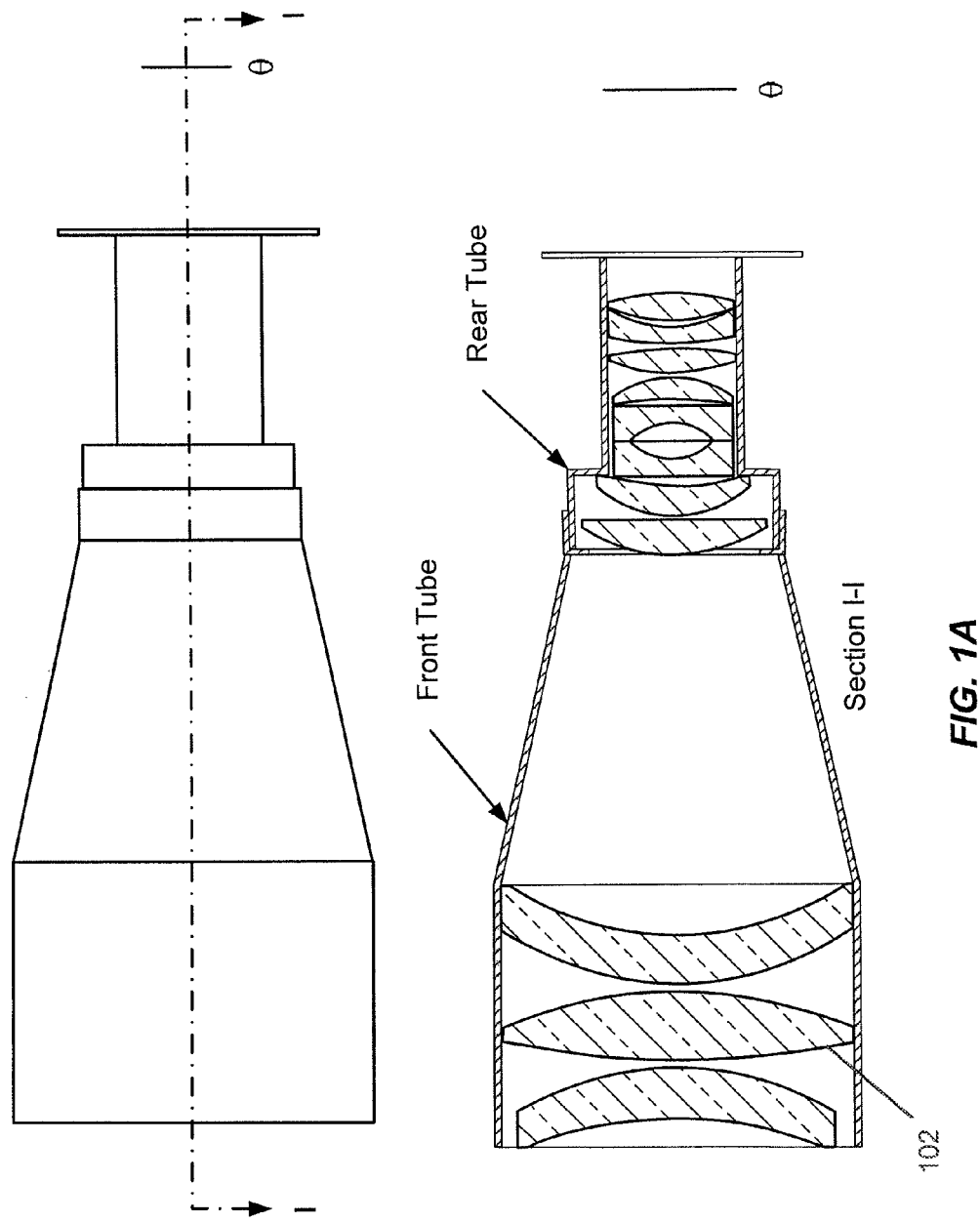
FIGS. 1a and 1b illustrate a relay element according to one embodiment.
Figure 1B:
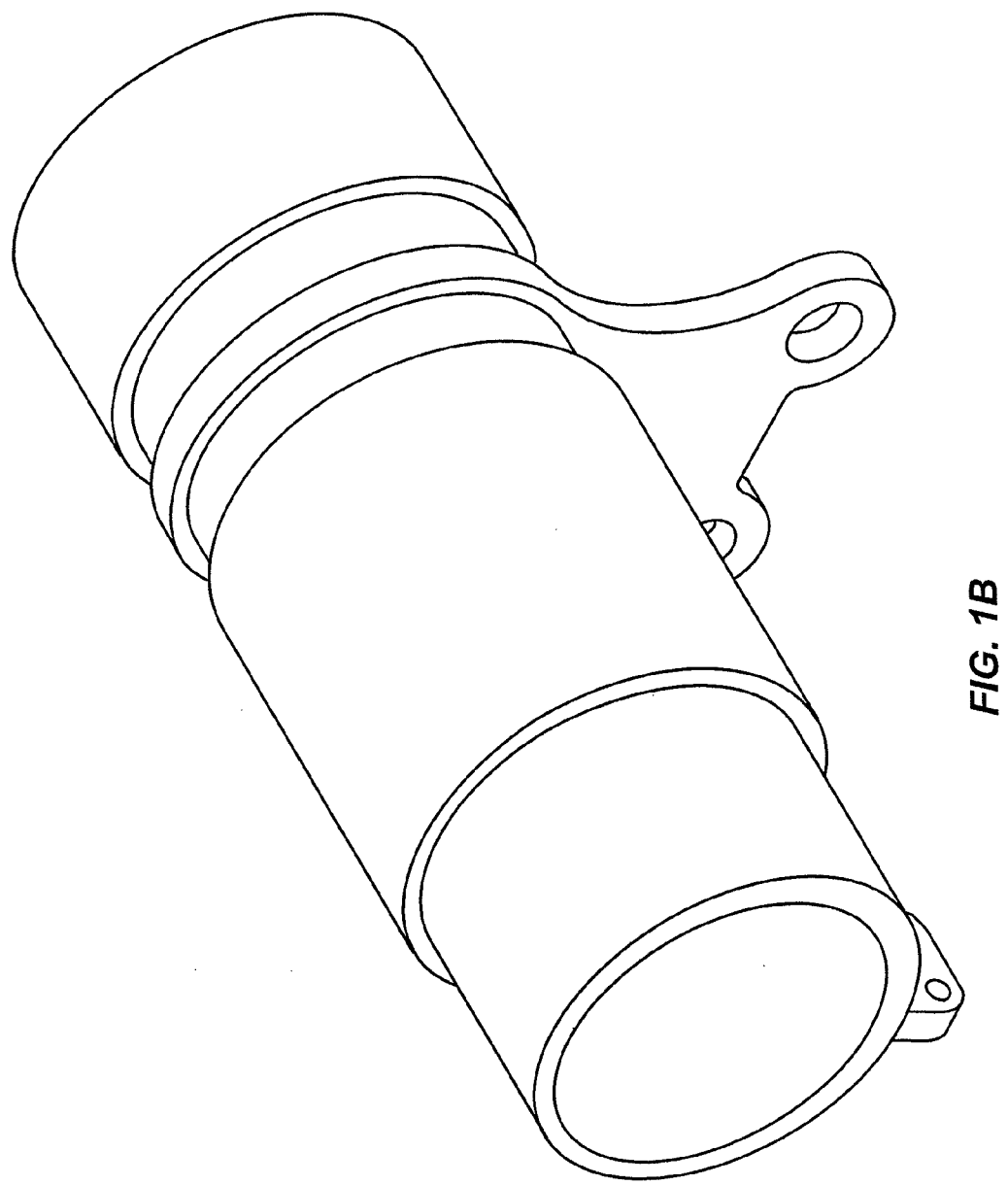
Figure 2A:
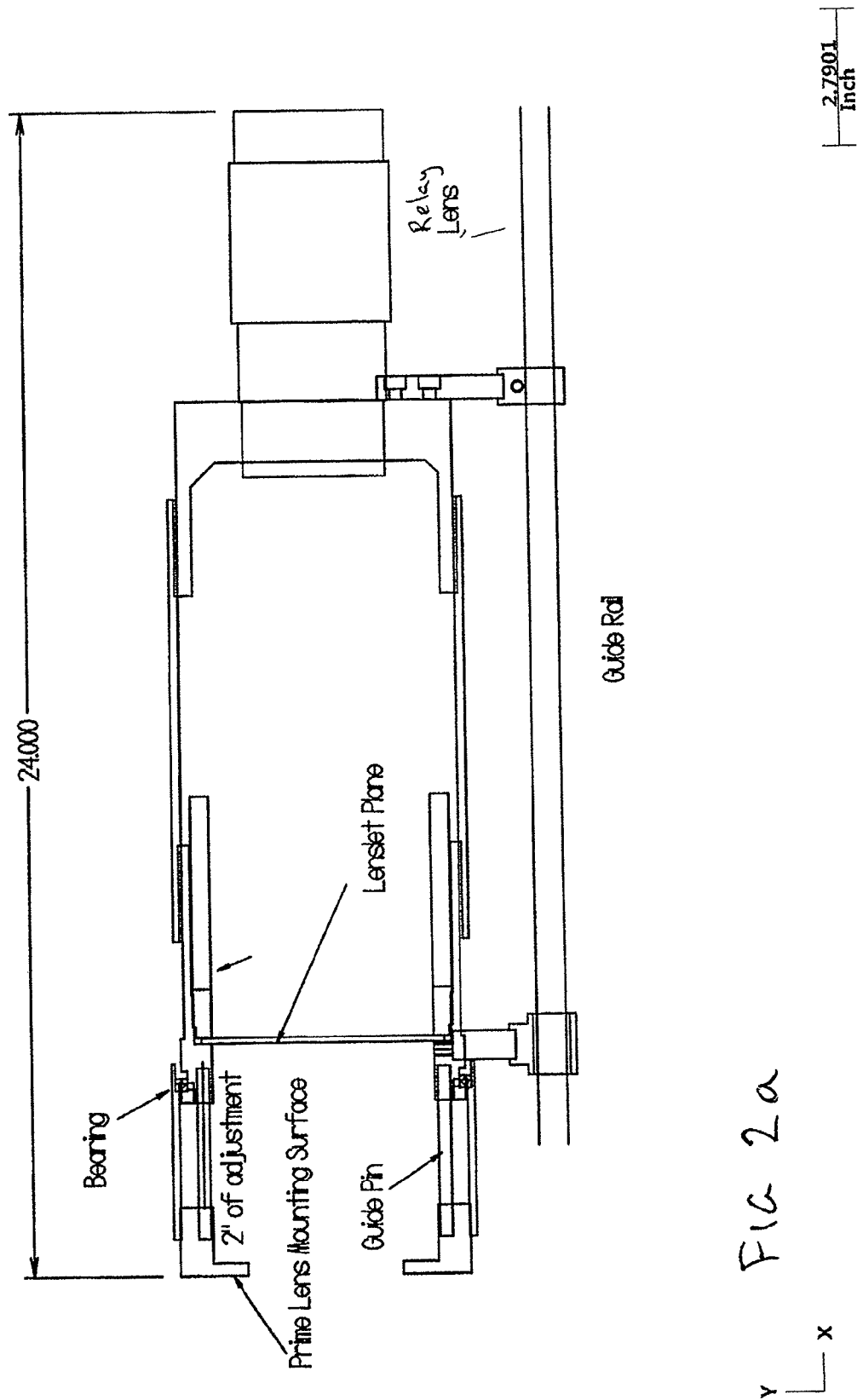
FIG. 2 is a side view of a more detailed example of a housing structure (e.g., lens barrel), including elements (e.g., threads, bearings) to allow for manipulation and adjustment of spacings of optical elements according to one embodiment.

FIGS. 1a and 1b illustrate a relay element according to one embodiment. As shown in FIG. 1a, a first set of optical elements in the front tube (including a field lens 102 such as a prime lens) receives light refracted by the lenslet array (not shown) and collimates and focuses that light onto a second set of optical elements in the rear tube, which focus the light onto an image plane (not shown). A sensor, e.g., CCD, CMOS or film, positioned at the image plane receives and records image(s). FIG. 1b shows a perspective view of an example of a housing structure (e.g., lens barrel), with the relay lens on the left side In certain aspects, the field lens (shown as 602 in FIG. 6), lenslet array and relay optical elements are contained within a housing structure (e.g., lens barrel) that allows for adaption of distance between the various elements, e.g., by manual rotation or manipulation, or by electronic control via a controller subsystem. FIGS. 2A and 2B show different views of more detailed examples of two housing structures (e.g., lens barrels), including elements (e.g., threads, bearings) to allow for manipulation and adjustment of spacings of optical elements according to certain embodiments. In certain aspects, the various optical elements are contained within a housing structure at fixed distances.

Figure 3:
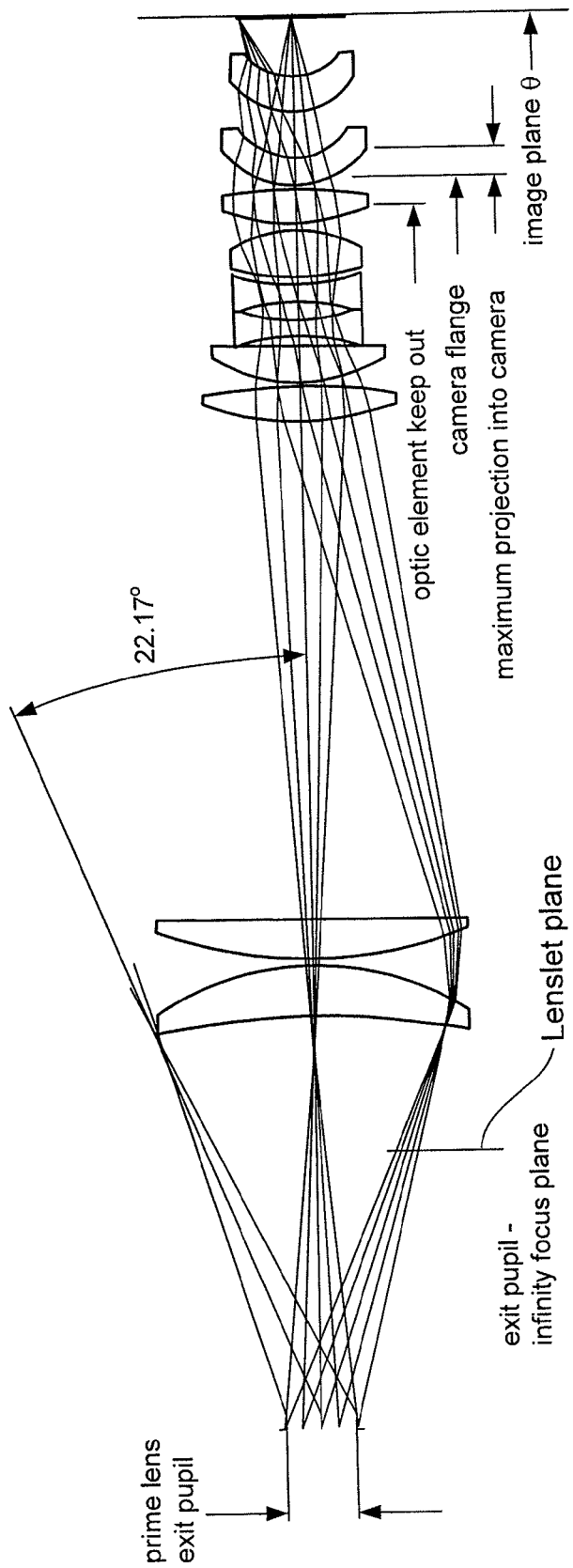
FIG. 3 is an example of optical elements for a specific light field imaging system according to one embodiment.

FIG. 3 is an example of optical elements for a specific light field imaging system according to one embodiment. It should be understood that the dimensions and specific elements may be changed as would be apparent to one skilled in the art based on the teachings herein. Light is focused by the field lens onto a focus plane (approximately 45 mm-108.5 mm from the prime in this example). A field lens can include a prime lens (or any other fixed focal length lens) or a zoom lens. A lenslet array positioned proximal the focus plane refracts the light into a plurality of images. The light refracted by the lenslet array is collected, collimated and focused by the first set of optical elements onto a second set of optical elements as shown. The second set of optical elements is configured and arranged to focus that light onto an image plane as shown. Again, a sensor located proximal the image plane collects image data (e.g., digital data in the case of CCD or CMOS sensors, or latent images in the case of film). In the example shown, the image plane is approximately 240 mm-300 mm from the lenslet array/focal plane of the prime. In certain aspects, with appropriate selection and/or adjustment of elements in the relay lens, the distance between the image plane and the lenslet array can be set at, or adjusted to be, from about 30 mm to about 300 mm or greater.

Figure 6:
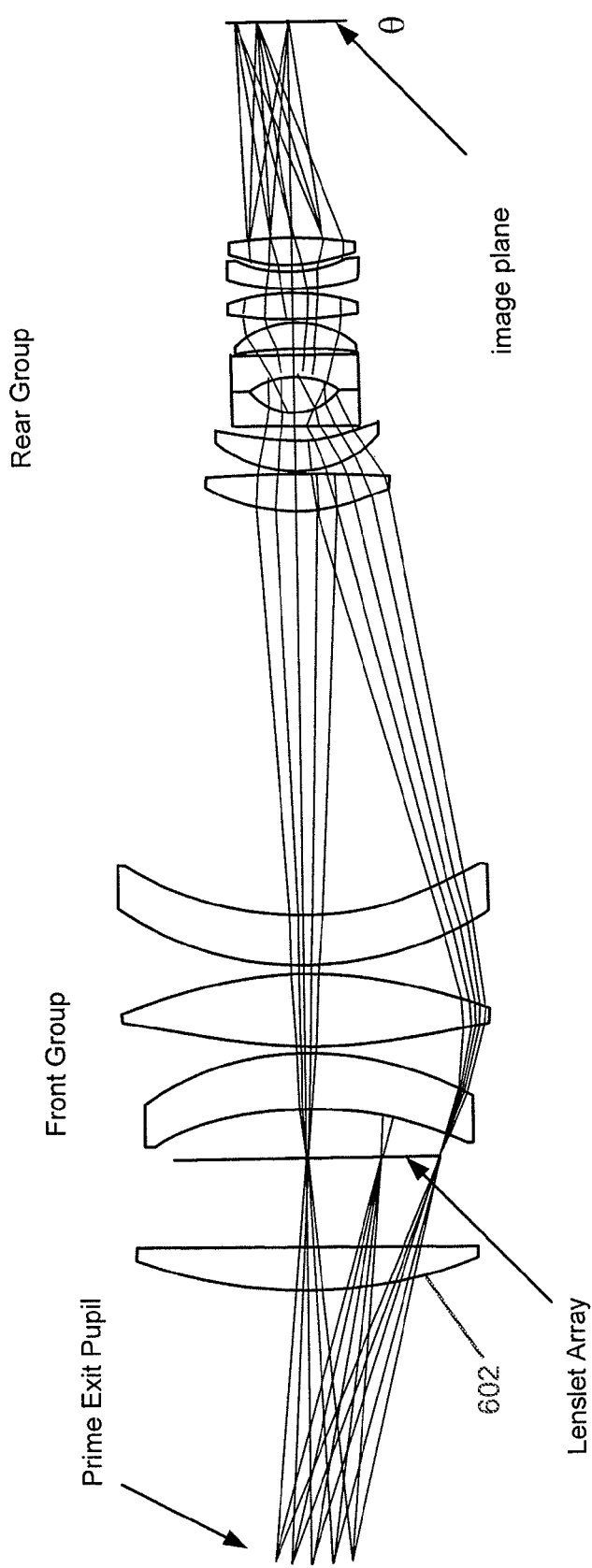
FIGS. 6 and 7 illustrate examples of relay lenses having specific arrangements of optical elements according to certain embodiments.
Figure 7:
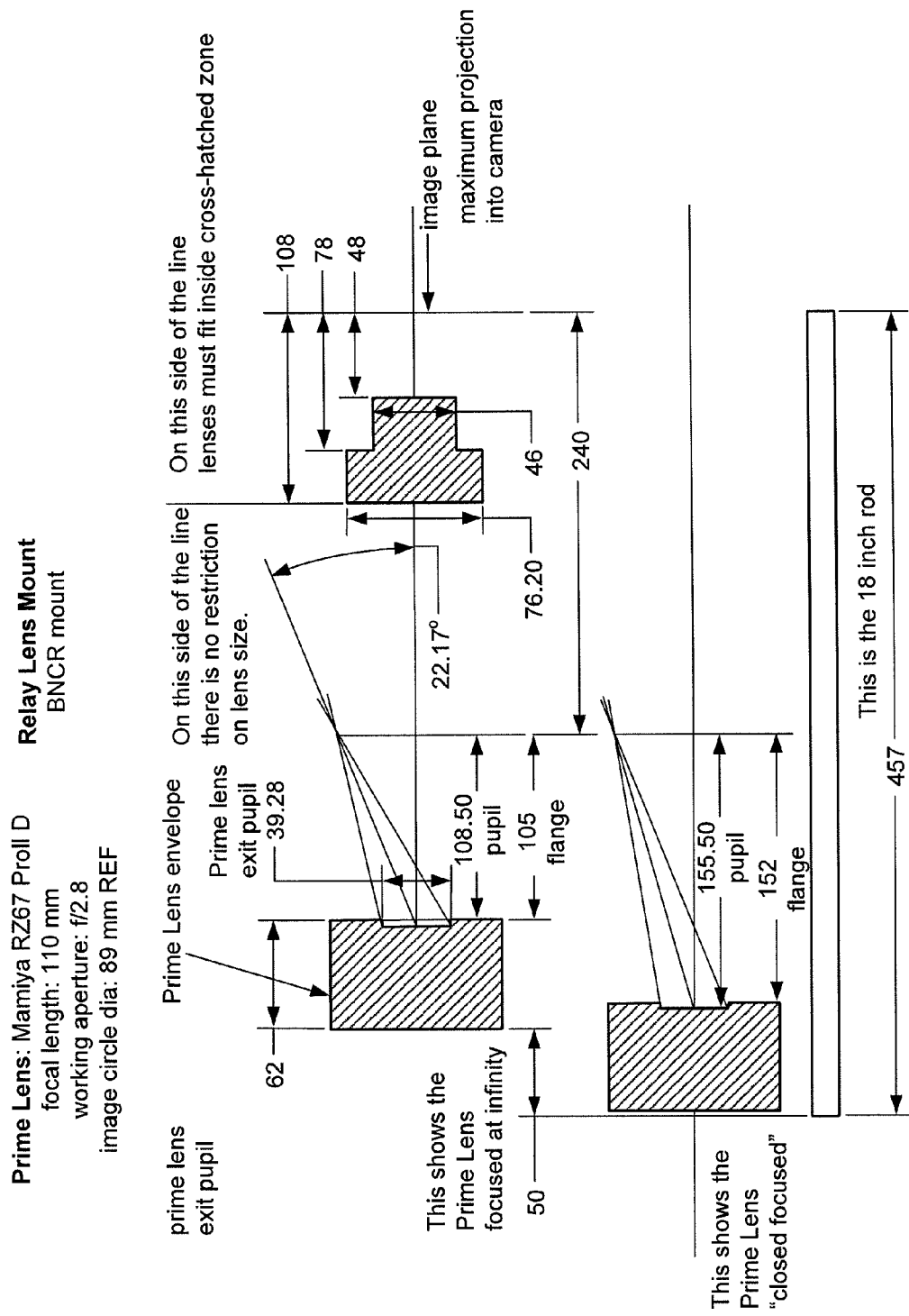

FIGS. 6 and 7 illustrate examples of relay lenses having specific arrangements of optical elements according to certain embodiments.

In certain aspects, it is desirable that the f# of the prime match the f# of the lenslet array to allow for better image separation at the lenslet array. In certain aspects, the f# of the prime should be the same as or less than the f# of the lenslet array. For example, a prime having f/2.8 or f/4 would work well with a lenslet array having f/2.8, or f/4, respectively.

In certain aspects, it is desirable to take the output of the light field image system and process the image data, e.g., to convert it to different formats for post processing functions such as depth map formats for compositing, manipulating and rendering 2D images, to produce right eye/left eye 3D images, to refocus foreground images and/or background images together or separately (depth of field adjustment), and to move the camera angle, etc. According to one embodiment, a process for such a pipeline begins with camera data acquisition (e.g., acquire raw image files), then camera calibration (e.g., process and store calibrated light fields) and then light field rendering (e.g., to produce DPX, TIFF, EXR or zmap files or other file types). For digital sensors, an interface with a storage subsystem or computer system allows for data transfer. For film, scanning of images using a film scanner can be performed to produce digital data.

Figure 4:
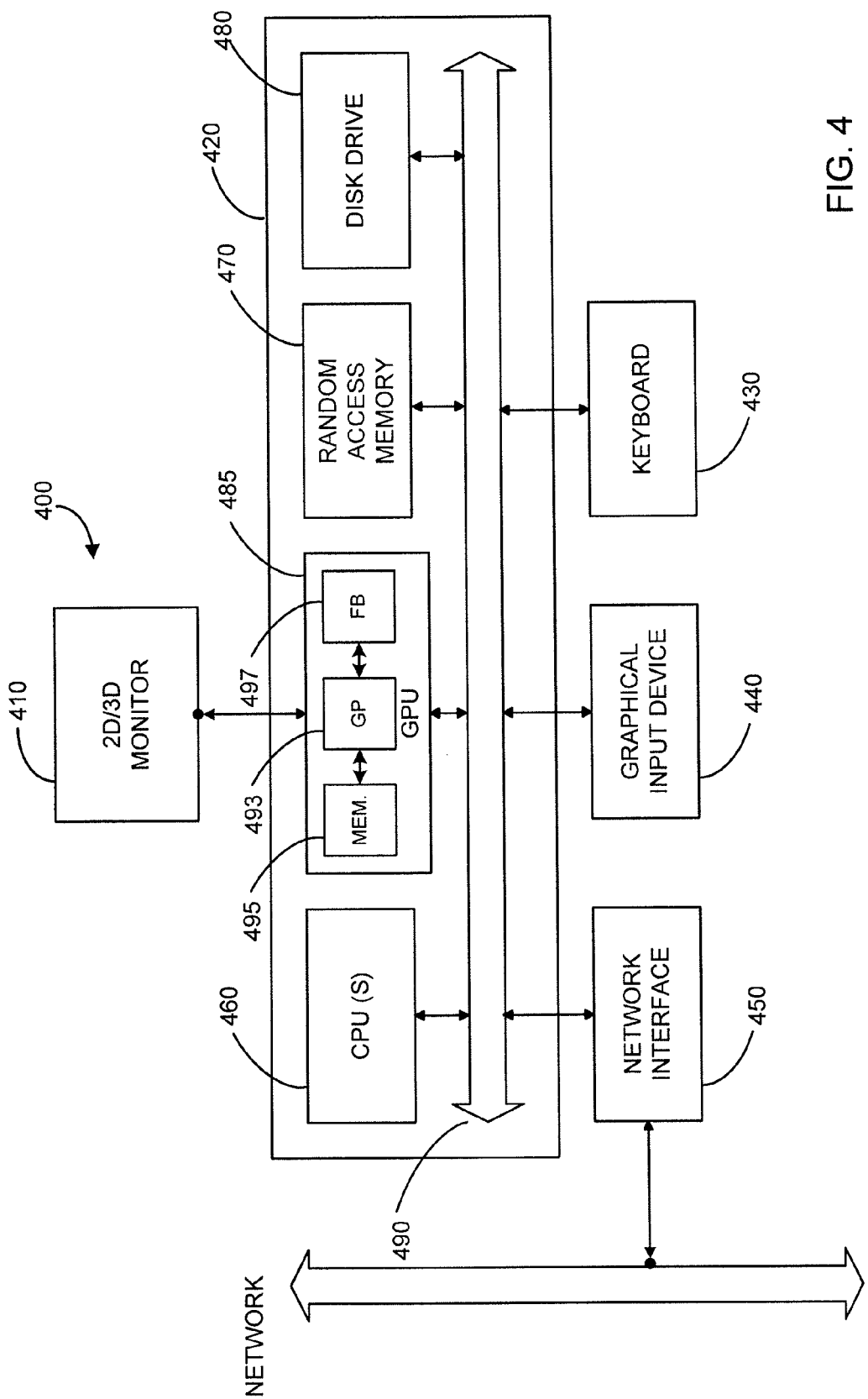
FIG. 4 is a block diagram of a computer system that may be used to practice embodiments of the present invention.

FIG. 4 is a block diagram of a computer system that may be used to practice embodiments of the present invention, in particular image data calibration (see below), data processing and image manipulation and rendering. FIG. 4 is merely illustrative of an embodiment incorporating the present invention and does not limit the scope of the invention as recited in the claims. One of ordinary skill in the art would recognize other variations, modifications, and alternatives.

In one embodiment, computer system 400 typically includes a 2D or 3D monitor 410, computer 420, a keyboard 430, a user input device 440, computer interfaces 450, and the like.

In various embodiments, user input device 440 is typically embodied as a computer mouse, a trackball, a track pad, a joystick, wireless remote, drawing tablet, voice command system, eye tracking system, and the like. User input device 440 typically allows a user to select objects, icons, text and the like that appear on the monitor 410 via a command such as a click of a button or the like.

Embodiments of computer interfaces 450 typically include an Ethernet card, a modem (telephone, satellite, cable, ISDN), (asynchronous) digital subscriber line (DSL) unit, FireWire interface, USB interface, and the like. For example, computer interfaces 450 may be coupled to a computer network, to a FireWire bus, or the like. In other embodiments, computer interfaces 450 may be physically integrated on the motherboard of computer 420, and may be a software program, such as soft DSL, or the like.

In various embodiments, computer 420 typically includes familiar computer components such as a processor 460, and memory storage devices, such as a random access memory (RAM) 470, disk drives 480, a GPU 485, and system bus 490 interconnecting the above components.

In some embodiments, computer 420 includes one or more Xeon microprocessors from Intel. Further, in one embodiment, computer 420 includes a UNIX-based operating system.

RAM 470 and disk drive 480 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of useful tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 485 may be any conventional graphics processing unit that may be user programmable. Such GPUs are available from NVIDIA, ATI, and other vendors. In this example, GPU 485 includes a graphics processor 493, a number of memories and/or registers 495, and a number of frame buffers 497.

FIG. 4 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 5A:
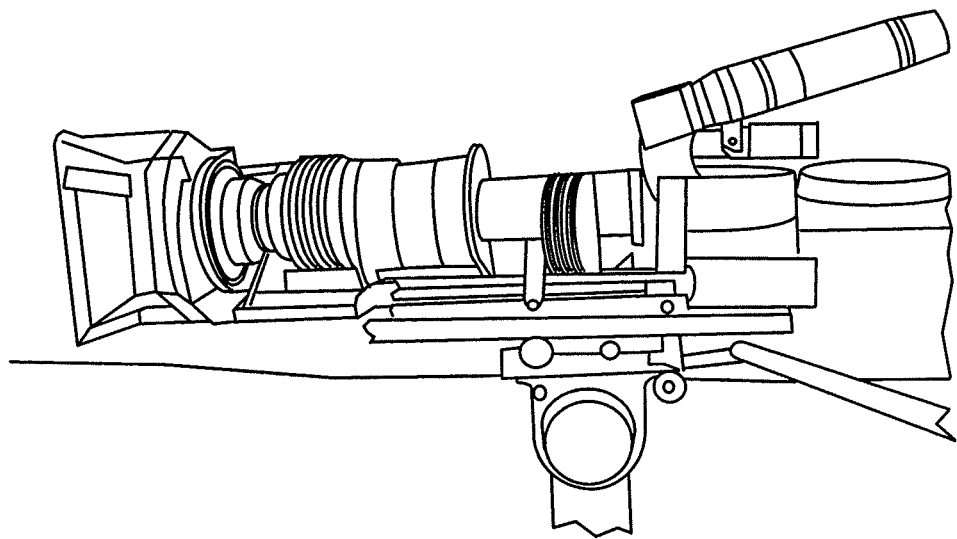
FIG. 5a shows a lens coupled with a film camera and FIG. 5b shows a lens coupled with a digital camera
Figure 5B:
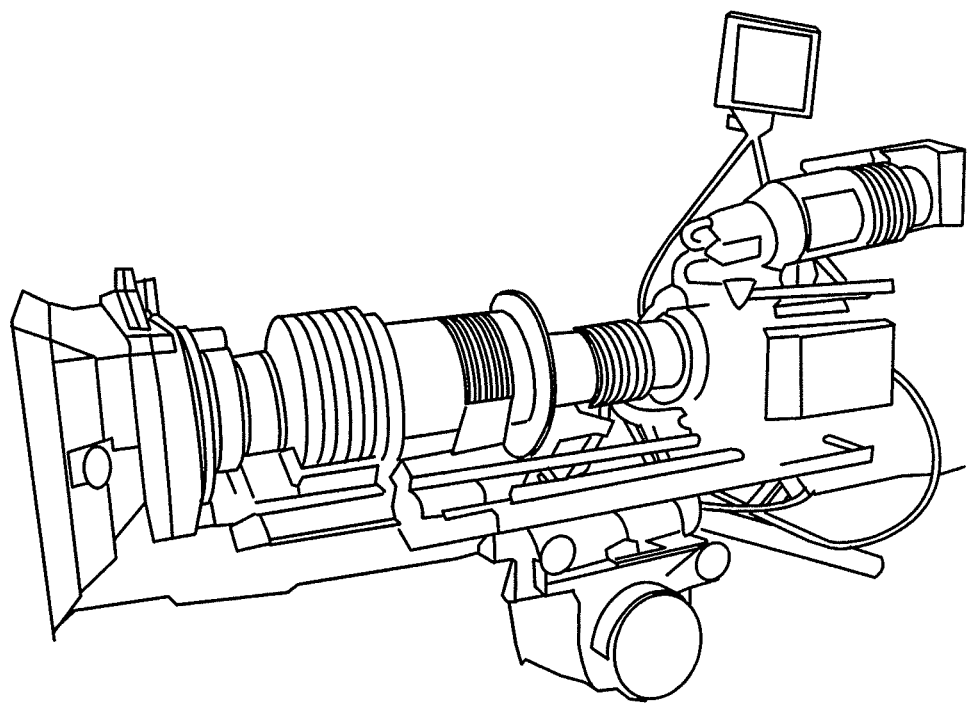

FIG. 5 illustrates two pictures of a lens according to one embodiment; FIG. 5a shows a lens coupled with a film camera and FIG. 5b shows a lens coupled with a digital camera.

Lenslet Array Elements

Figure 21:
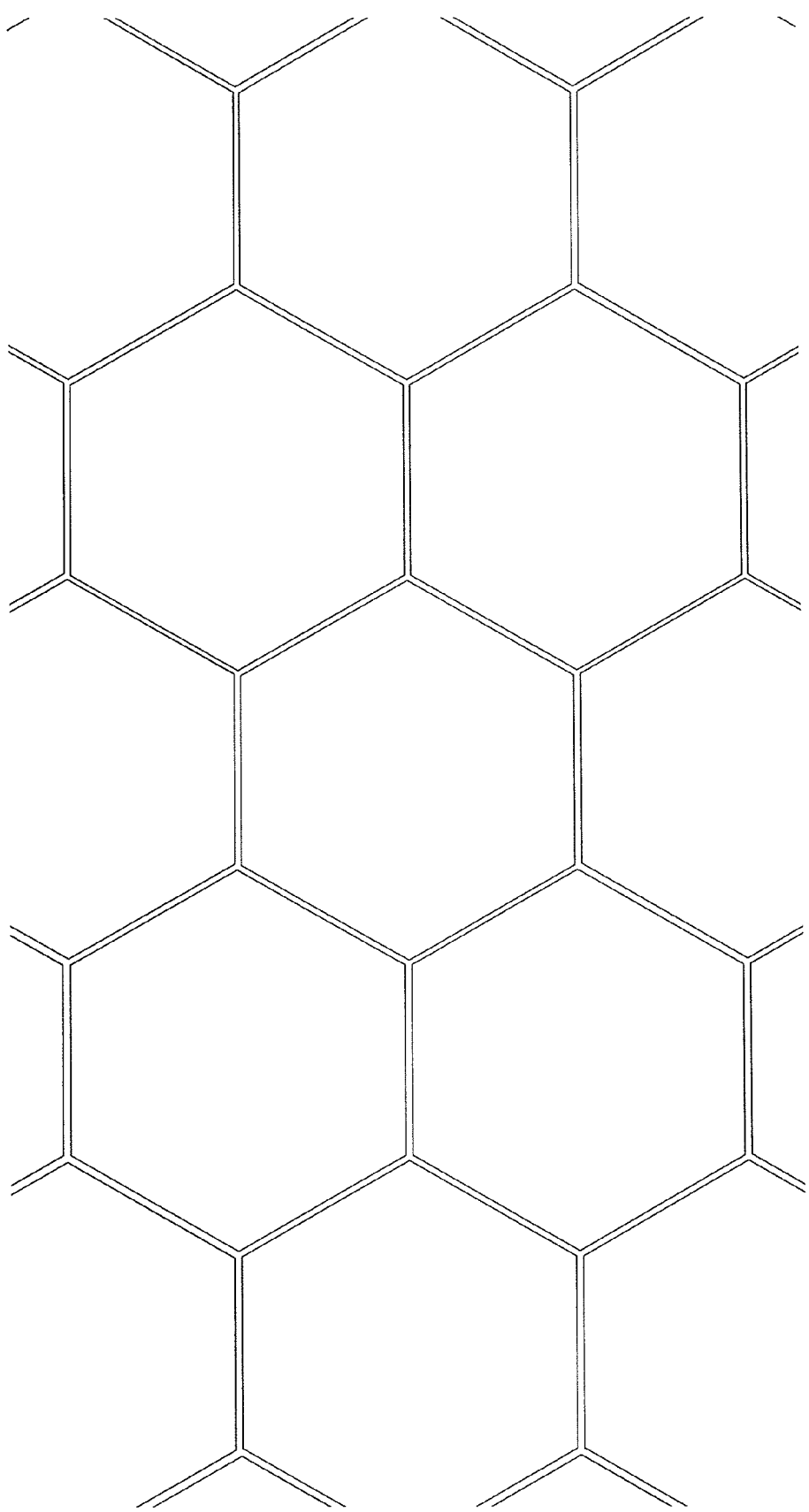
FIG. 21 illustrates an example of hexagonal-shaped lenslet packing according to one embodiment.

In certain embodiments discussed above, the lenslet array includes a plurality of circular shaped lenslets arranged in an array. In another embodiment, a lenslet array, or a lenslet array element, includes a plurality of polygonal shaped lenslets arranged in an array. With spherical shaped lenslets, even for a densely packed array, approximately 24% of the image may be lost due to the packing constraints of spherical shaped features. Polygonal shaped elements can advantageously be more densely packed so that less image is lost due to greater coverage of the area of the lenslet array element by the individual lenslets. FIG. 21 illustrates an example of hexagonal-shaped lenslet packing according to one embodiment. For example, with hexagonal shaped lens-let packing (for use in a plenoptic lens) the loss may be reduced to about 10 to 12%, advantageously providing a substantial gain in resolution. In general, hexagonal features provide for the densest packing in a plane and minimize wastage. In certain aspects, a packing density of between about 100 lenslets per (linear) inch and about 300 per inch or more can be used. Other polyogonal and non-spherical shapes or geometries may be used. Additionally, differently shapes/geometries of lenslets may be used, and/or different sizes of lenslets may be used to form the array of lenslets.

In another embodiment, a doublet lenslet array element is provided (compared to a single lenslet array element discussed above). In this embodiment, two lenslet array elements are glued or otherwise bonded together to form a doublet lenslet array element. Each individual lenslet array element includes a plurality of lenslets arranged in an array. In this embodiment, light from the field lens interacts with (e.g., is refracted by) the first lenslet array, and then interacts with the second lenslet array. Such an arrangement advantageously allows for reduced diameter of the optical components of the relay lens, for example. With a single lenslet array, for example, diffraction at the edges may provide a 35 degree angle (growing, away from optical axis), whereas with the doublet arrangement, diffraction at the edges of the doublet provides a decreased angle, for example 20 degrees, thereby providing a reduced diameter light field. This in turn allows for a smaller barrel housing size. It is important that each lenslet in the doublet includes a different material. For example, in certain aspects, one lenslet array element of the double can be a positive lens and the other lenslet array element can be a negative lens, with the combination/doublet forming a positive lens. Chromatic abberation is advantageously be reduced with a doublet arrangement, and the refraction angle is advantageously reduced as well as the barrel size needed. Any of a variety of optical materials/glasses may be used as desired for the appropriate design specifications, e.g., f#, packing density, etc. Examples of useful optical materials include fused silica, borosilicate, fused quartz, etc. In general any pairing of crown and flint glass may be used.

Calibration

A superplenoptic lens, such as disclosed herein, makes images using a lenslet array. Each image is a rectangular array of sub-images, one per lenslet. Pixels in the lenslets are indexed by 4-dimensional coordinates—2 dimensions to select a sub-image and 2 further coordinates to select pixels from the sub-images. In one embodiment, the pixel coordinates are taken to range from −½ to ½ across each sub-image, so the nominal size of the sub-image is 1×1, with its center at coordinate (0,0). Because the sub-images are indexed with integers, the 4 coordinates can be reduced down to 2 numbers by addition, so the integer parts of the 2-dimensional coordinates identifies the sub-image and the fractional parts (e.g., between −0.5 and 0.5) select pixels within sub-images.

To use images captured by a superplenoptic lens, it is necessary to map coordinates in lenslet space to coordinates in the image. The mapping can be approximated well with an affine transformation, possibly combined with a radial distortion term. The calibration process approximates the lenslet-to-sensor mapping, starting with a frame captured by the superplenoptic camera. No special calibration target is required, any well-lit frame will do. The calibration procedure relies on the fact that due to vignetting by the lenslets, the sub-images are mostly bright in the middle and black near the corners.

In certain embodiments, an autocorrelation of the calibration image is first calculated. This value will be large at positions corresponding to multiples of the lenslet spacing (and at other points, due to noise). Peaks are extracted from the autocorrelation and a histogram of pairwise distances between the peaks is made. The first local maximum of the histogram (above a certain noise threshold) gives an estimate of the lenslet spacing. It should be appreciated that minima could also be used. Second, the estimated spacing is used as the filter width of a low-pass filter that is run over the original image. This blurs out all details within the lenslets, leaving (mostly) only bright spots centered on the lenslet centers. Another peak-detection pass selects candidate lenslet centers from the filtered image.

Next, the candidate list is culled; for each candidate, the number of neighboring points within a certain percentage (e.g., 20%) of the original lenslet spacing estimate is counted. If there are exactly 4 such neighbors, the candidate point is accepted. By walking the neighbor graph of the accepted points, a lenslet number is assigned to each. Finally, a least-squares fit of the lenslet-to-sensor mapping fitting is applied to the assigned lenslet numbers and measured locations of each acceptable candidate.

Figure 15:
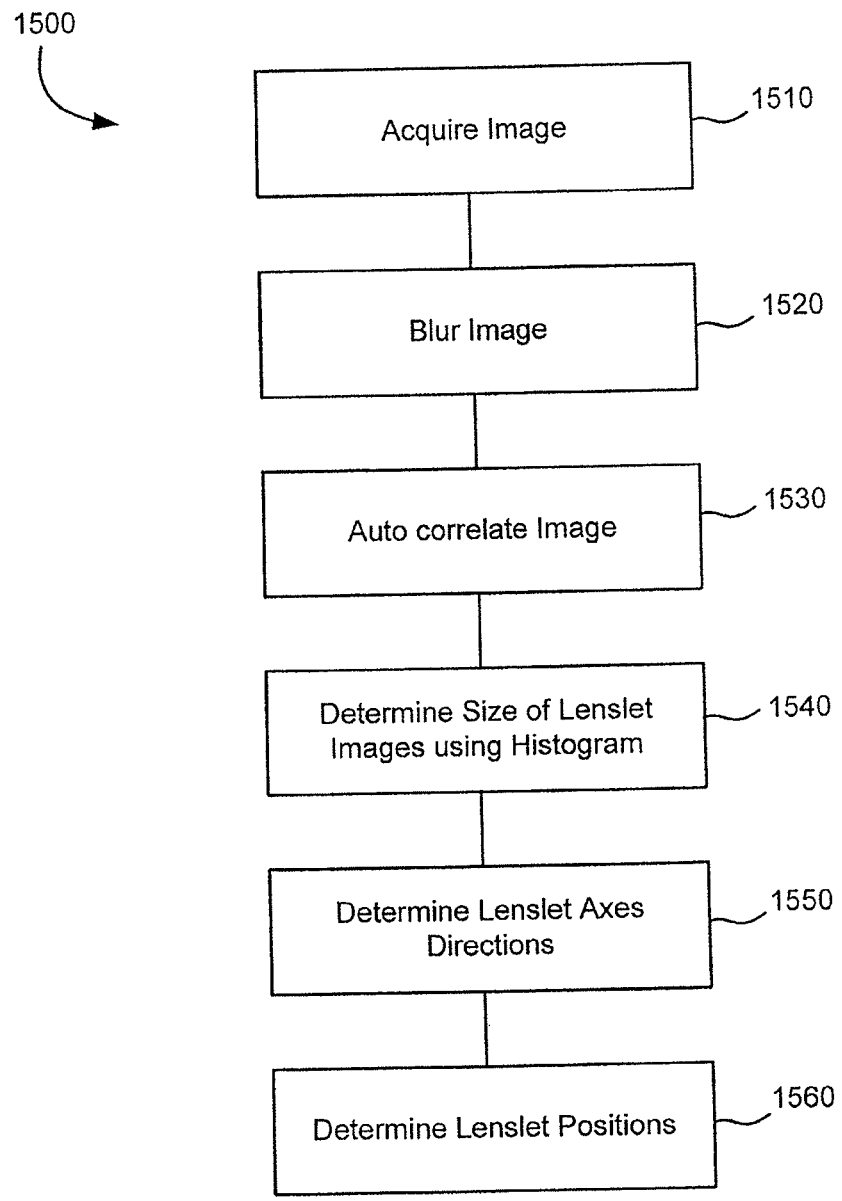
FIG. 15 shows a method of calibrating images according to one embodiment.
Figure 18:
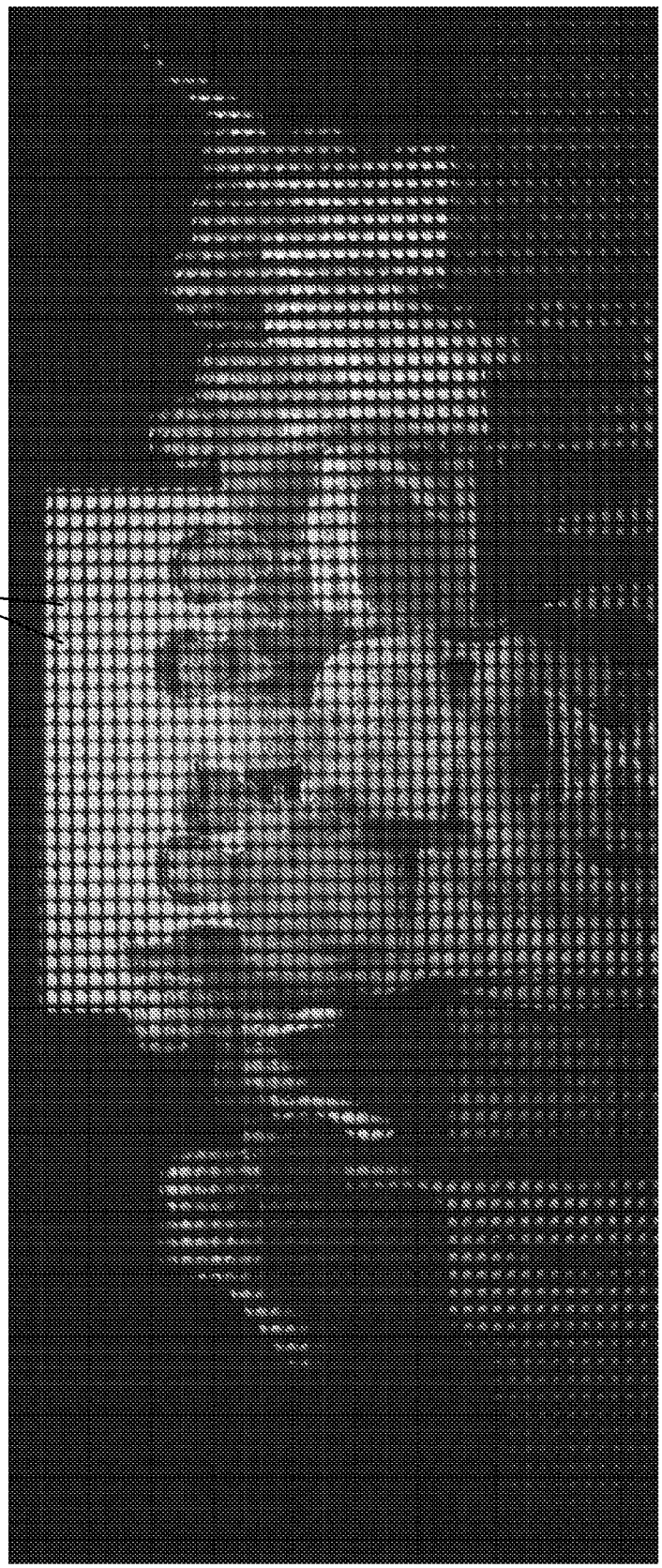
FIG. 18 illustrates an example of a lightfield image captured using a plenoptic lens.

As discussed above, in order to use the images taken using a plenoptic lens according to the embodiments described herein, it is desirable to calibrate the images to determine the locations and dimensions of the lenslet images within each image. According to one embodiment, a method 1500 of calibrating images is shown in FIG. 15. In step 1510, an image is acquired. The image acquired (e.g., lenslet image) includes an array or matrix of individual lenslet images. FIG. 18 illustrates an example of a lightfield image captured using a plenoptic lens. As can be seen, the lightfield image includes a plurality of tiny images 1810 taken from different viewpoints.

Certain features of the image are sufficiently unknown that it is difficult to know the dimensions of each lenslet image. For example, the angle of the lenslet array relative to the image plane (sensor) is not known and the magnification of the relay lens is not sufficiently known. Even with robust components, the image plane angle may vary from shot to shot due to movement of the camera, for example, as the camera and components are not sufficiently rigid. For example, over a range of 20 pixel images, movement might be on the order of 0.5 pixels, whereas a 0.1 pixel or better resolution is generally needed. Also, the lenslet array may be canted relative to the image plane; the angular deviation of the lenslet array to the sensor array is typically on the order of 0.5 degrees or less. Therefore, the dimensions of the lenslet images are not sufficiently known.

In step 1530, an optional autocorrelation function is applied to auto-correlate the lenslet images to determine spacing parameters of the lenslet images. Generally, the auto-correlation function involves convolving the lenslet array image with itself; the image is correlated with itself at different offsets and it becomes desirable to identify the offset that lines up identical features in the various lenslet images. In certain embodiments, an a priori estimate of the lenslet spacing could be used in place of autocorrelation. In general, autocorrelation is used to determine what filter to use when filtering the field image to enhance the peaks. Hence, in one embodiment, a step of identifying a peak enhancement filter is performed before a step of filtering the field image, where autocorrelation is one way used to identify a peak enhancement filter.

In one embodiment, an optional blur filter is applied to the lenslet images at step 1520 before auto-correlation. This is done to remove detail from the images as detail in the images is not important for determining spacings, dimensions and locations of the lenslet images. Generally any blur filter may be used as no parameters need to be tuned.

Figure 16:
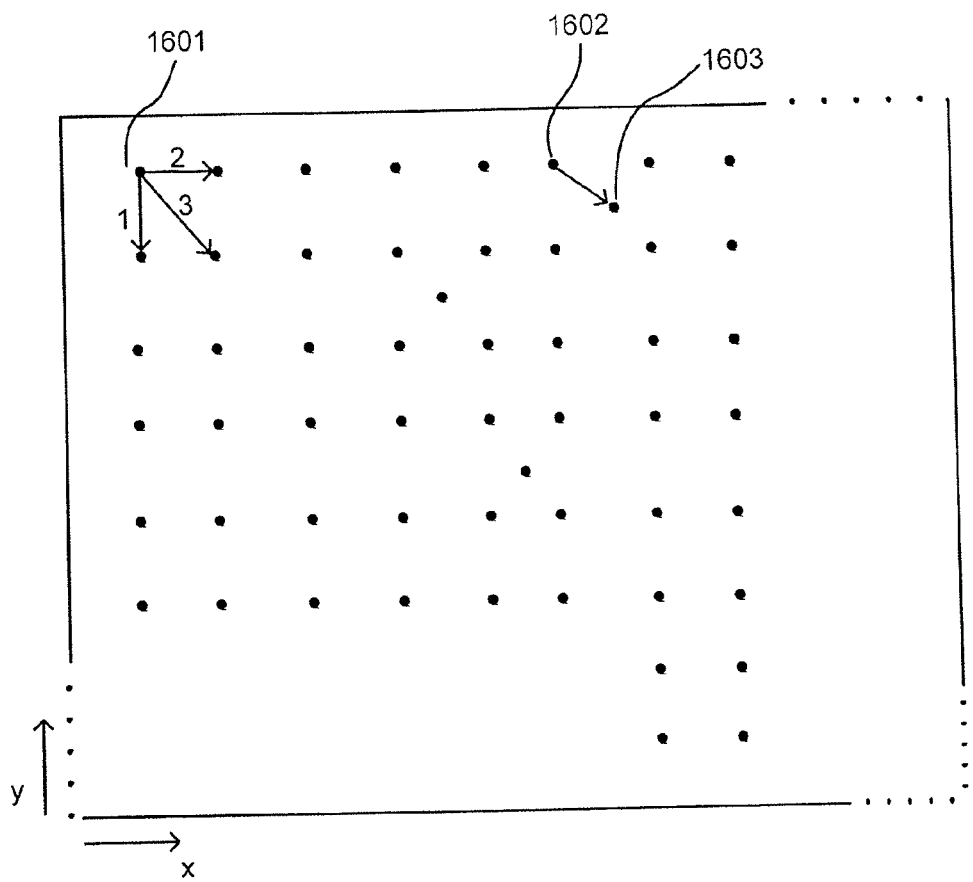
FIG. 16 shows an example of an autocorrelation image showing peaks or extrema.
Figure 17:
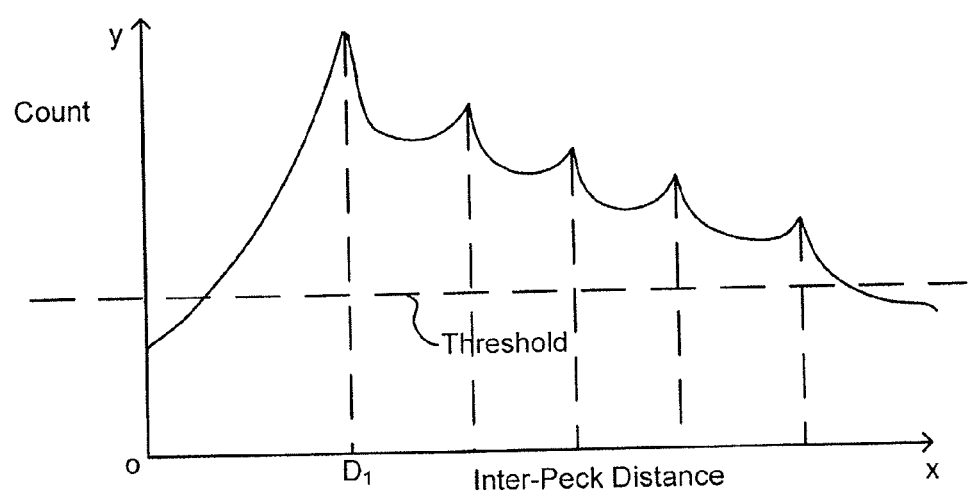
FIG. 17 shows an example of a histogram for the inter-peak distances.

The result of the autocorrelation step 1530 produces an image of regularly spaced spikes or peaks representing all possible offsets. An example of the autocorrelation image showing peaks is shown in FIG. 16. In step 1540, a histogram of inter-peak distances is created for all possible pairs of peaks (or a subset of all pairs of peaks). For example, a list of x and y coordinates for the peaks is created, and for each peak, a list of distances between all other peaks is determined. FIG. 16 shows distances for the three closest peaks to peak 1601. A histogram of inter-peak distances is then formed. An example of such a histogram is shown in FIG. 17. As can be seen, a series of histogram peaks results. Generally, the first histogram peak represents a good estimate of the lenslet size (e.g., the spacing between peaks represents a good estimate for the vertical and horizontal dimension of each lenslet image in the array). In general, there may be some noise, due to for example peaks such as peak 1603, in this case the inter-peak distance between peak 1602 and 1603 creates a noise count. If desired, in one embodiment, noise can be reduce by removing a portion of the data, for example removing all histogram peaks below a threshold value from the data. In certain aspects, the threshold value is set at a percentage (e.g., 5, 10 or 15 percent of the max histogram peak height).

In step 1550, directions of the lenslet images are determined. As above, the lenslet images may be canted relative to the image plane, e.g., by about 0.5 degrees or so. In one embodiment, the directions of vectors representing the closest peaks along x and y directions (based on the x-y coordinates of peaks) are sorted into two buckets, or bins, and averages are taken of each bucket to determine average perpendicular inter-peak directions. Because the cant is typically less than 0.5 degrees, one bucket will generally consist of vectors having a predominant x component, and the other will consist of vectors having a predominant y component. Hence the average of each bucket provides an estimate of the directions between lenslet images.

In step 1560, the center positions of the lenslet images are determined. In one embodiment, this is done by first assuming that the corner is at the origin. All images are then added up, which typically results in a black spot oriented in the center of the composite image. The position of this spot relative to the corner can be used to determine the offset to determine the position of the corner of a lenslet image. Each center spot should have exactly 4 neighbors at correct distances in a matrix; lenslet coordinates can be assigned to each center (e.g., with an arbitrary coordinate assignment for the matrix origin) and a least squares fit can be used to obtain the calibration matrix.

It should be appreciated that the calibration methodologies described herein may be performed offline after image capture, or they may be performed in real time as images are being captured.

Calibration Function

One embodiment of a calibration function includes a simple affine transformation. That is, it is assumed that there is a linear relationship between lenslet coordinates and pixel coordinates. There are six parameters, (e.g., a, b, c, d, e, and f) such that if (x,y) is a point in lenslet space and (X,Y) is a point in pixel coordinates, then:

$X=ax+by+c$ $Y=dx+ey+f$

The least-squares optimization to find a, b, c, d, e, and f works as follows:
Given a bunch of pairs of corresponding points $((X[i],Y[i]),(x[i],y[i])),0<=i<n$ (those are the output of the first few phases of the calibration procedure), the total squared calibration error for the pairs is:

```
double error=0;
for(i=0;i<N;i++){
    double dx=a*x[i]+b*y[i]+c−X[i];
    double dy=d*x[i]+e*y[i]+f−Y[i];
    error+=dx*dx+dy*dy;
}
```

The optimization process calculates (a, b, c, d, e, and f) to minimize this error term. In certain aspects, Newton's method is used to find a zero of the gradient of the error. The same method works for any calibration function that is suitably continuous in its parameters.

In some cases, it may be desirable to correct for radial distortion of the relay lens as well. In this case, the calibration function can be made slightly more complex and a few more parameters can be added to be optimized. For example, in addition to the affine parameters (a, b, c, d, e, and f), there could be three more parameters (g, h, and j) that specify the center of the radial distortion and its intensity:

$u=ax+by+c-g$ $v=dx+ey+f-h$ $r=1+j(u^2+v^2)$ $X=ur+g$ $Y=vr+h$

The affine part characterizes the shape and orientation of the lenslet array. The distortion part characterizes the relay lens. One can make more complicated radial distortion models by adding terms with higher even powers of $u^2+v^2$ (and corresponding extra parameters). In certain embodiments, j substantially equal to 0 and g and h are irrelevant, since they cancel out when j=0.

Collimated Pinholes

In certain aspects, it is desirable to be able to calibrate the camera using the scene footage the camera crew shot as discussed above. In certain circumstances where that may be infeasible a flat white field can be used. In this case, the lenslets produce vignetted images of the field from which lenslet corners and centers can be easily located as discussed above. In another embodiment, a calibration image that puts a tiny spot at the center of each lenslet is used. To accomplish this, in one embodiment, the field lens is replaced with an illuminated pinhole at the focal plane of a collimating lens. In this case, the order of the elements in the assembly would be Light source
Pinhole
Collimator
Lenslet array
Relay lens
Sensor The effect is to project the image of the pinhole out to infinity. This configuration sends a bundle of parallel rays to the lenslet array, which will focus the rays at the lenslet centers (if the pinhole is carefully centered to start with.) Then, the lenslet centers can be located to sub-pixel precision by computing the centroids of the projected pinhole images. Either target choice (flat field or collimated pinhole) allows for a list of candidate lenslet locations to be obtained, which can be used to drive the rest of the calibration process.

Depth Estimation

After acquisition of raw frames from the plenoptic camera, the images are processed to densely recover depth in the original scene. For the sake of this description, consider that each lenslet image consists of a square n×n matrix of pixel values. If a corresponding pixel is extracted from each of the lenslet images and they are arranged as an image, n×n images of the original scene can be produced, each imaged from a particular different position on the main field lens. Because these images are obtained from a precision, calibrated screen of precisely determined dimension, the relative world space shifts in viewpoint between all these virtual images are known. This reduces the dimensionality of the search needed to be performed relative to other less constrained multiple view stereo algorithms. Instead of recovering individual camera positions for each of the n×n cameras, one can solve for their median position.

After recovering the camera position, depth can be determined by directly measuring the disparity of each pixel in the image, and from the disparity and the world space coordinate information, the relative depth of each pixel can be determined. Super-resolution techniques are then used to combine all of the images back together along with depth information, and generate a layered depth image which can be used by more conventional compositing tools that implement depth-based compositing.

Image Processing

According to certain embodiments, using the image information obtained from the plenoptic camera, various computational processes can be applied to the image information to modify and produce images with varied characteristics. Examples include producing 2D or 3D images, depth of focus changes for still images as well as for motion pictures (series of images), adjusting focus points in images, changing camera angles or creating new camera views, selectively focusing on near field or far field separately or simultaneously. It should be appreciated that the image processing methodologies described herein may be performed offline after image capture, or they may be performed in real time as images are being captured.

Depth of Focus changes can be applied for motion pictures as well as to still shots. In this case, a shot in live action can have the fore/middle and/or far ground in focus simultaneously. See, e.g., Light Field Photography with a Hand-held Plenoptic Camera by Ren Ng, Marc Levoy, Mathieu Bredif, Gene Duval, Mark Horowitz, Pat Hanrahan, Siggraph 2005; and The Light Field Camera: Extended Depth of Field, Aliasing and Super-resolution by Tom E. Bishop and Paolo Favaro, IEEE TRANSACTIONS ON PATTERN RECOGNITION AND MACHINE INTELLIGENCE, each of which is incorporated by reference in its entirety, for techniques for producing depth of focus changes.

In one embodiment, extracting depth information from light fields involves extracting depth information from the lenslet images in multi-view stereo. For example, with multitudes of lenslet images, e.g., approximately 20,000 to 25,000 lenslet images, in a typical scene, multi-view stereo can be done either directly on lenslet images or low resolution images can be constructed by taking corresponding points from different lenslets. With prior 3D systems, for example, the sudden changes in the depth of foreground focus in the image caused eye muscles to fatigue quickly. With the present embodiment, by matching the depth of the attention points in the image in the scenes across cuts it (eye fatigue) will be prevented. Being able to adjust in post production is a big In one embodiment, various camera angle computational changes are made in post-production. When the camera is set up in a particular way, one can slightly change the angle and position of the camera in post production using the information provided by the plenoptic camera. In certain aspects, a new camera can be synthesized from the image data. Additionally, a synthesized camera, given the part of the light field that the synthetic camera captures, can be adjusted. Examples of camera view adjustments, or new camera views that can be created, include trucking (e.g., moving the camera forward and backward), panning, tilting, zooming, etc.

In one embodiment, selective focus of the image field can be accomplished using the light field information gathered by the plenoptic camera. For example, in the same image, one can focus on near field and far field, advantageously providing the ability to have everything in focus at all times. The focus curves for the lenslet cameras typically have two depths at which the focus is anomalous. At one depth all depth and resolution information may be lost. The samples inside the lenslet are the same at all pixels; it is convenient to have the focus on one side of that depth either infinity or up close. Focus control is about adjusting the camera to get the maximum amount of information out of it, e.g., to keep the low resolution spots in places where you have no scene (image).

Figure 8:
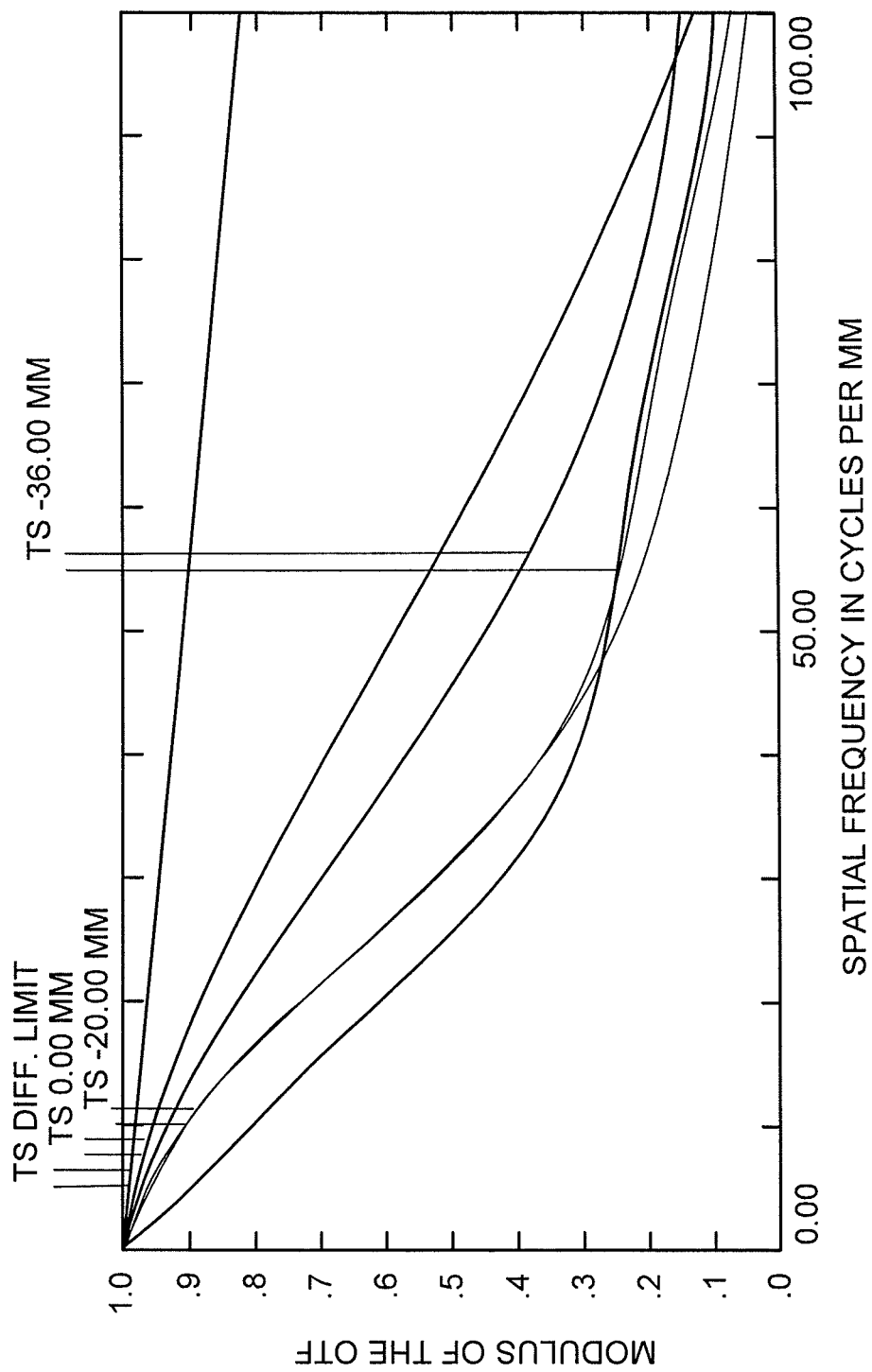
FIG. 8 shows a Polychromatic Diffraction MTF (Modulation Transfer Function) for a super plenoptic lens.
Figure 9:
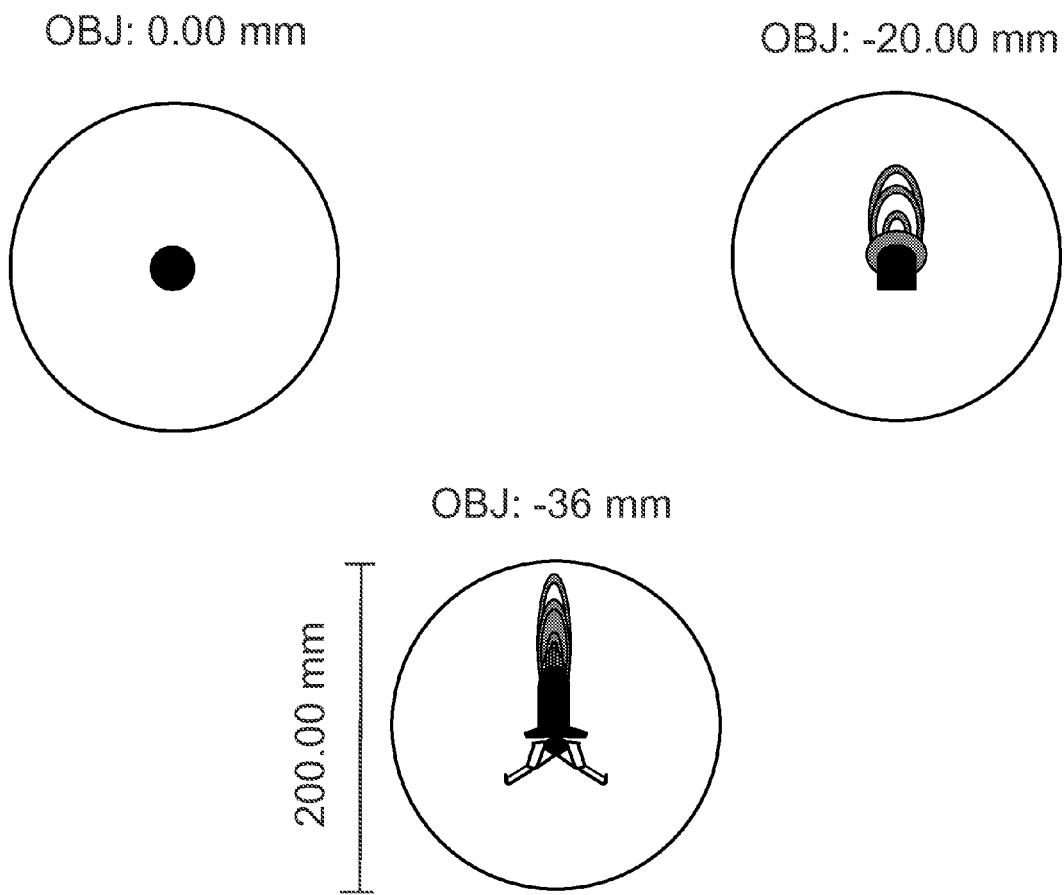
FIG. 9 illustrates a spot diagram for a super plenoptic lens.
Figure 10:
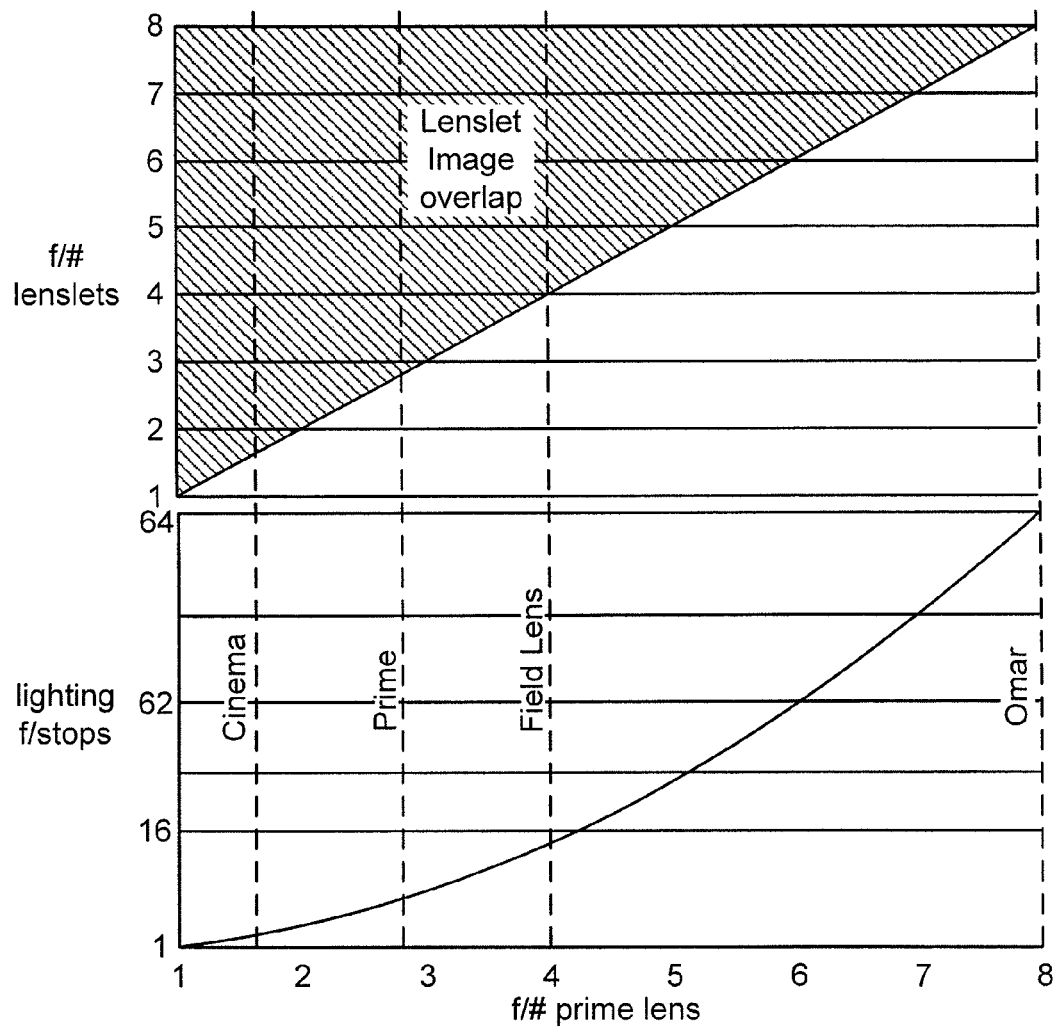
FIG. 10 illustrates a graph of Lens f# vs. Lenslet f# vs. f-stops of a Prime lens.
Figure 11:
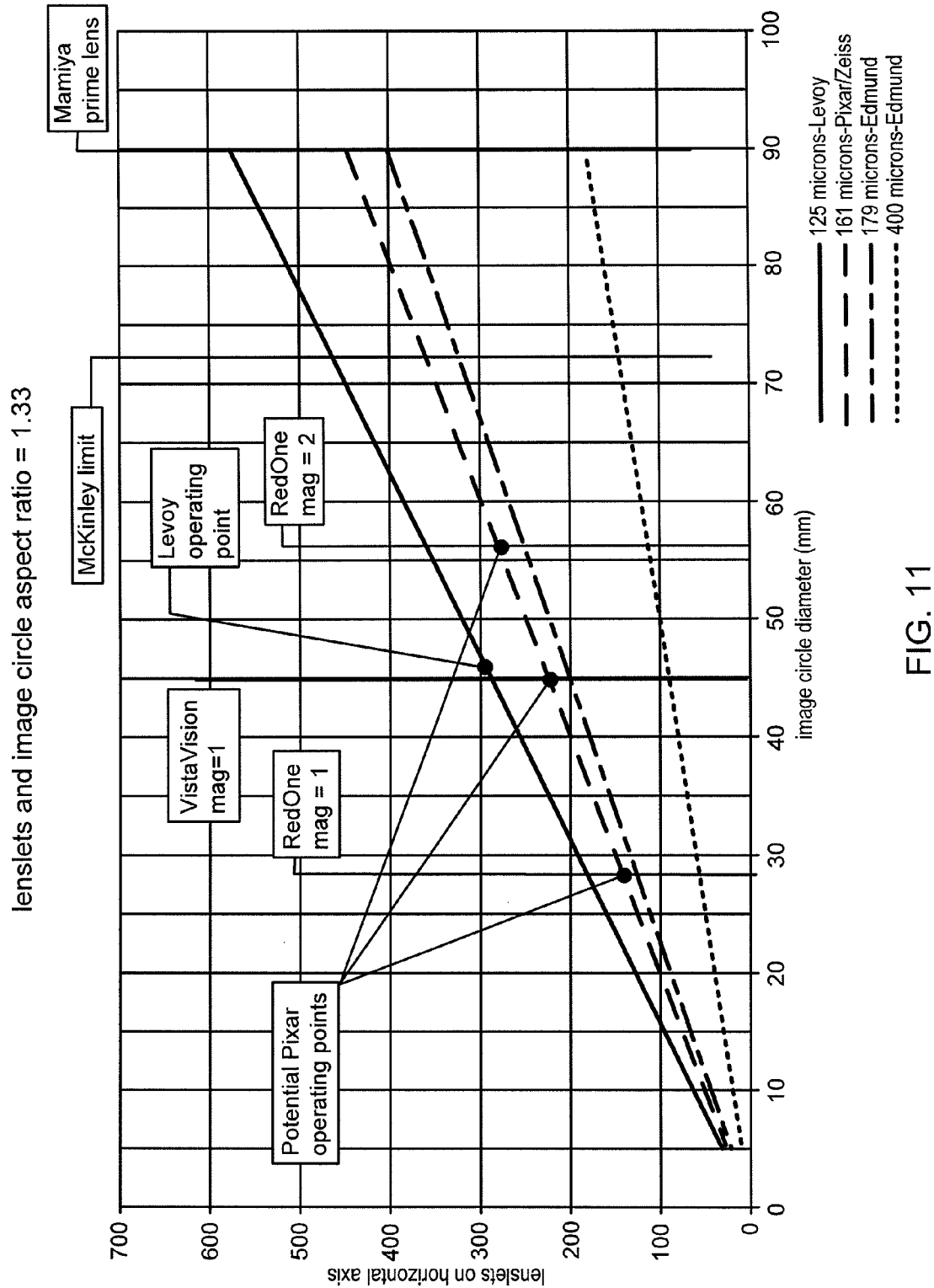
FIG. 11 illustrates a graph of lenslets vs. image circle diameter for various light field cameras.
Figure 13:
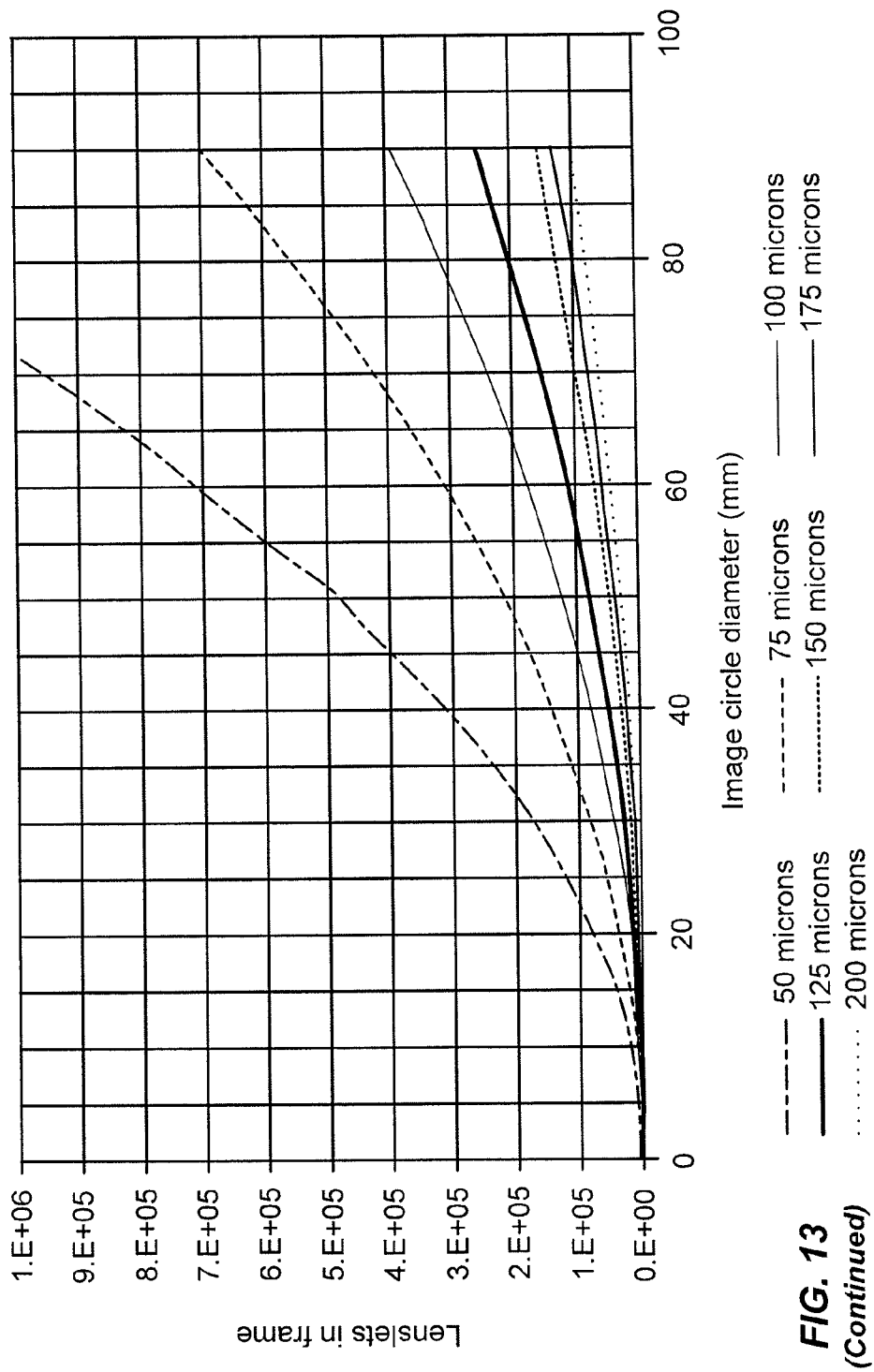
FIG. 13 shows lenslet vs. image circle metadata for the lens of FIG. 7.

FIGS. 8-14 show various performance parameters for superplenoptic lens components. FIG. 8 shows a Polychromatic Diffraction MTF (Modulation Transfer Function) for a super plenoptic lens. FIG. 9 illustrates a spot diagram for a super plenoptic lens for three different field positions (with object distances from the optical axis being 0.0, −20.00 mm, and −36 mm, respectively). FIG. 10 illustrates a graph of Lens f# vs. Lenslet f# vs. f-stops of a Prime lens and FIG. 11 illustrates a graph of lenslets vs. image circle diameter for various light field cameras. FIG. 12 illustrates image circle metadata for a superplenoptic lens as shown in FIG. 7, and FIG. 13 shows lenslet vs. image circle metadata for the lens of FIG. 7. FIG. 14 shows data for various motion picture prime lenses.

Focus Controller System

Figure 19:
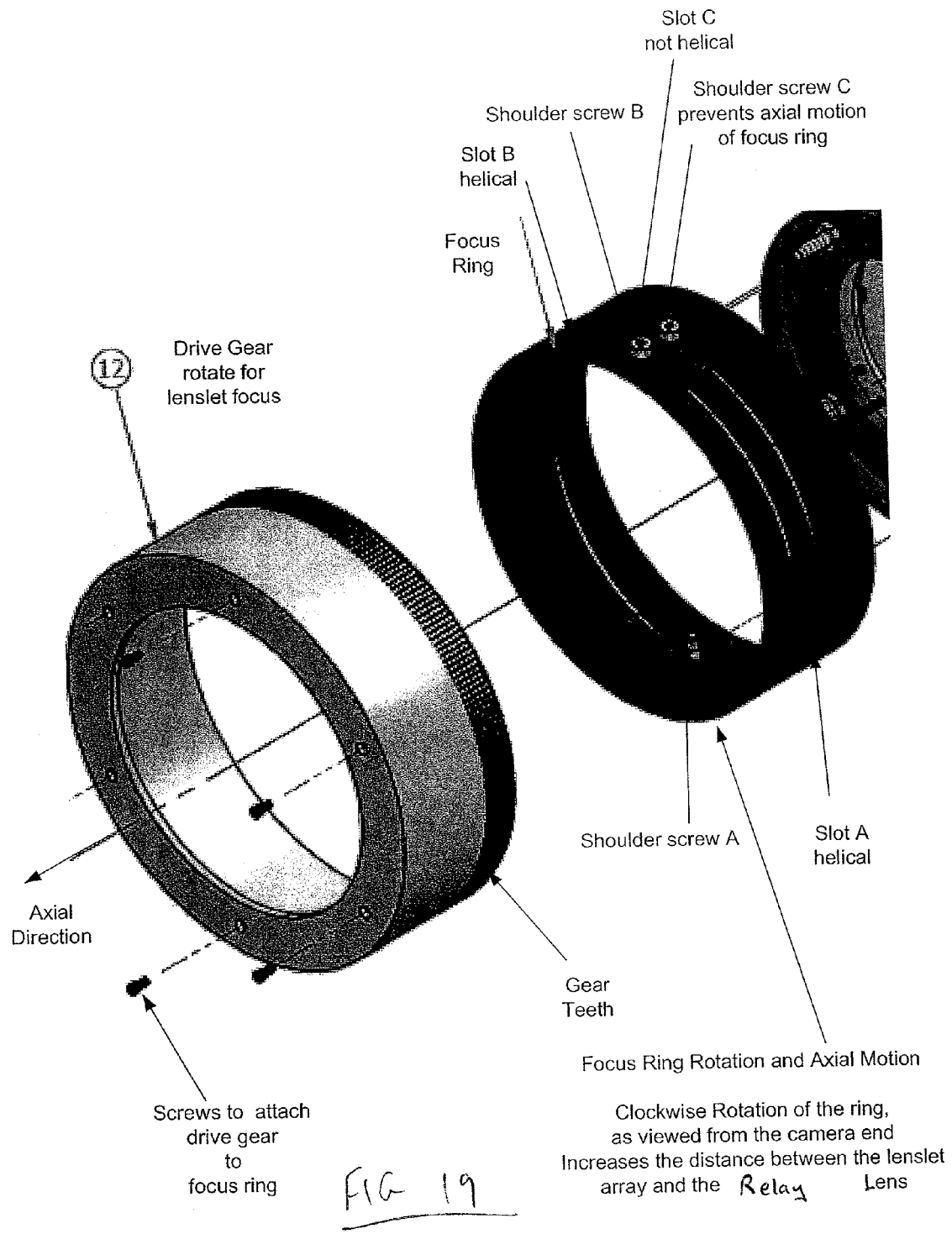
FIG. 19 illustrates elements of a focus controller system according to one embodiment.

In one embodiment, a focus controller system includes two focus control elements, one to control the position of the prime lens relative to the lenslet array and another to control the distance of the lenslet array relative to the relay lens elements. For example, the prime can be adjusted for optimal or maximum replication (to capture a light field), e.g., a rate of 4 or 8, or set at infinity, and the lenslet array element can be adjusted to obtain optimal focus within each lenslet. FIG. 19 illustrates elements of a focus controller system according to one embodiment. As shown, a first focus controller includes a focus ring that allows for adjustment of the position of the lenslet array element along the optical axis. Activation of the focus ring, either manually or automatically (with a motor coupled with a drive gear) in response to a control signal, causes rotation of the ring, which changes the axial distance of the lenslet array due to the helical coupling between the ring and a fixed feature. For automatic focus control, industry standard follow focus automation can be used. Similarly, a second focus control element orring (not shown) is provided to concomitantly or separately control the axial location of the prime. The second ring can be either manually or automatically controlled. Additionally, another focus control element can be used for adjusting the focus of the field lens. In general, one or multiple focus controllers can be included to control focus of any or all of the field lens, the prime lens and the lenslet array.

In one embodiment, a fiducial mark or edge is provided on a lenslet array element to facilitate alignment of the lenslet array in the imaging system. Such a fiducial mark also advantageously reduces or eliminates the need to correct for misalignment after the fact. FIG. 20 illustrates an example of a lenslet array element (shown as an optical flat with no visual detail shown of the lenslets, which can be circular, non-circular, e.g., hexagonal, etc.) according to one specific embodiment. The fiducial mark or edge at the bottom allows for alignment verification. It should be noted that FIG. 20 shows a specific lenslet array element with specific parameters, however, it should be apparent that lenslet array elements with varying parameters can be used.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for plenoptic photography, the system comprising:
- a field lens;
- a doublet lenslet array element including a first lenslet array element coupled in close proximity to a second lenslet array element, each of the first and second lenslet array elements having a plurality of lenslets arranged in an array, wherein the first lenslet array element is a positive lens, wherein the second lenslet array element is a negative lens, and wherein the combination of the first and second lenslet array elements creates a positive lens;
- a sensor element, wherein the doublet lenslet array element is positioned between the field lens and the sensor element such that light that impinges on the doublet lenslet array passes through the field lens; and
- an optical relay element comprising a field lens and optical elements positioned between the doublet lenslet array element and the sensor element, the field lens being configured to gather light refracted from the doublet lenslet array and the optical elements being configured to focus the gathered light on to the sensor element, wherein the position of the lenslet array relative to the field lens is adjustable.

2. The system of claim 1, wherein the first lenslet array element is bonded to the second lenslet array element.

3. The system of claim 1, wherein the first lenslet array element is a positive lens and wherein the second lenslet array element is a negative lens.

4. The system of claim 1, wherein the doublet lenslet array element includes a fiducial mark feature on a surface of the element to assist with alignment of the lenslet array.

5. The system of claim 1, wherein the first lenslet array element is made from a first optical material, wherein the second lenslet array element is made of a second optical material, and wherein the first material is different than the second material.

6. The system of claim 5, wherein the first optical material and the second optical material each comprise one of fused silica, borosilicate, or fused quartz.

7. The system of claim 5, wherein the first optical material comprises a crown glass and wherein the second optical material comprise a flint glass.

8. The system of claim 1, wherein the optical relay element comprises a front tube containing a first set of optical elements and a back tube containing a second set of optical elements.

* * * * *